United States Patent [19]
Daigh et al.

[11] Patent Number: 6,155,400
[45] Date of Patent: Dec. 5, 2000

[54] MOBILE CONVEYOR INCLUDING ADAPTIVE ALIGNMENT SYSTEM

[75] Inventors: Raymond C. Daigh, Post Falls, Id.; Mark Richard Cranston, Newport, Wash.; Richard J. Monroe, Coeur d'Alene, Id.

[73] Assignee: RAHCO International, Inc., Spokane, Wash.

[21] Appl. No.: 09/046,811

[22] Filed: Mar. 23, 1998

[51] Int. Cl.[7] .......................... B65G 41/00; B65G 43/00; B65G 65/02

[52] U.S. Cl. .......................... 198/301; 198/304; 198/571; 198/587

[58] Field of Search .................................. 198/301, 304, 198/315, 316.1, 571, 587

[56] References Cited

U.S. PATENT DOCUMENTS

| | | |
|---|---|---|
| 3,361,248 | 1/1968 | Daymon . |
| 3,422,949 | 1/1969 | Bankauf et al. . |
| 3,782,536 | 1/1974 | Toney .................................. 198/316.1 |
| 3,897,640 | 8/1975 | Swisher, Jr. et al. . |
| 4,031,997 | 6/1977 | Nelson . |
| 4,206,840 | 6/1980 | Hanson . |
| 5,145,235 | 9/1992 | Smart ................................. 198/301 X |
| 5,185,935 | 2/1993 | McMillion et al. ................ 198/301 X |
| 5,390,105 | 2/1995 | Worley et al. ...................... 198/301 X |
| 5,749,452 | 5/1998 | Kanenwischer ......................... 198/301 |

Primary Examiner—Christopher P. Ellis
Assistant Examiner—Gene O. Crawford
Attorney, Agent, or Firm—Wells, St. John, Roberts, Gregory & Matkin, P.S.

[57] ABSTRACT

A conveyor system having a plurality of segments and articulable joints connecting adjacent segments is disclosed. Each segment is provided with an individually controllable drive unit for moving the conveyor segment over a surface on which the conveyor system is supported. Each joint between segments is provided with a sensor system to measure the amount of articulation at each joint. The conveyor system is further provided with a control system for aligning the segments of the conveyor system. The control system surveys each joint of the conveyor to determine which, if any, joints are out of alignment. The, extent of misalignment at each joint is measured and the joint having the maximum misalignment at the time is identified. The maximum velocity at which the overall conveyor system may travel is then limited based on the ratio between the maximum measurable misalignment and the maximum surveyed misalignment. The velocity for conveyor segments adjacent to each misaligned joint is then calculated based on the misalignment at the respective joint as well as the maximum velocity at which the overall conveyor system may travel. Segments at joints which have a high degree of misalignment will be repositioned to become aligned faster than segments at joints with a lesser degree of misalignment, to thereby generally bring all segments into alignment at the same time.

43 Claims, 12 Drawing Sheets

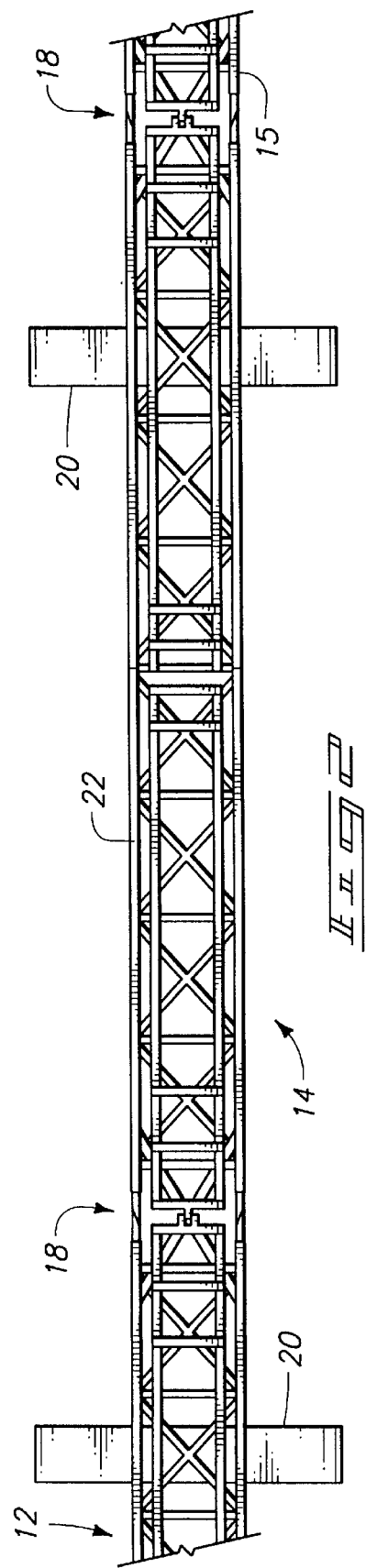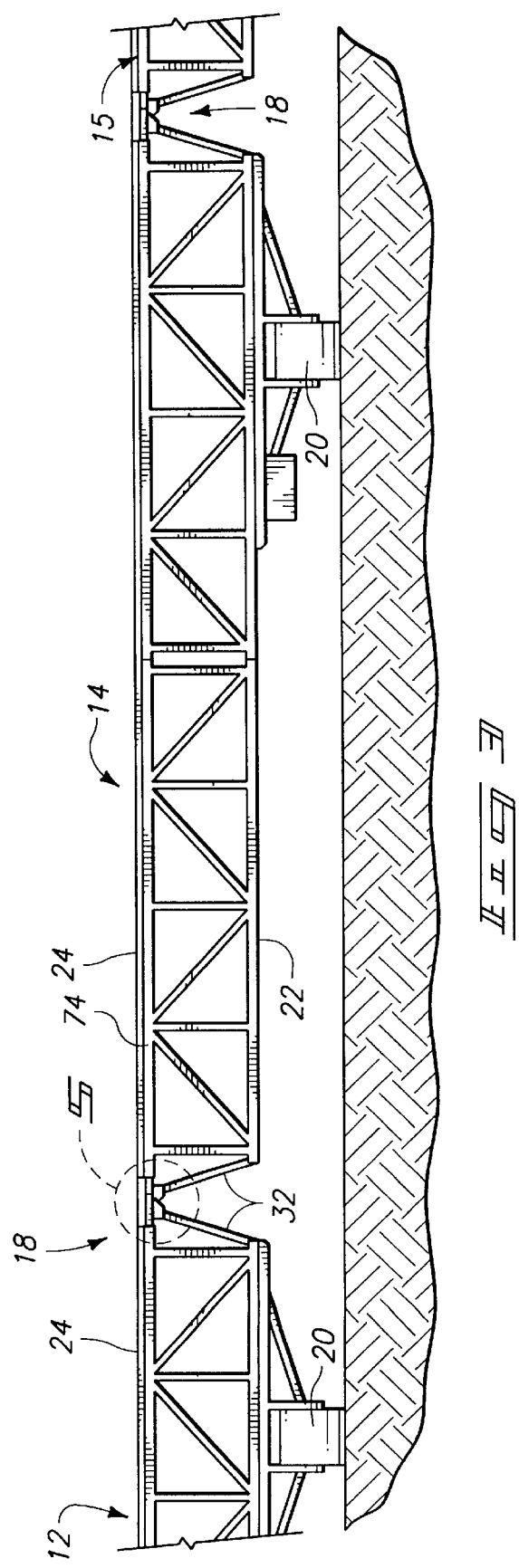

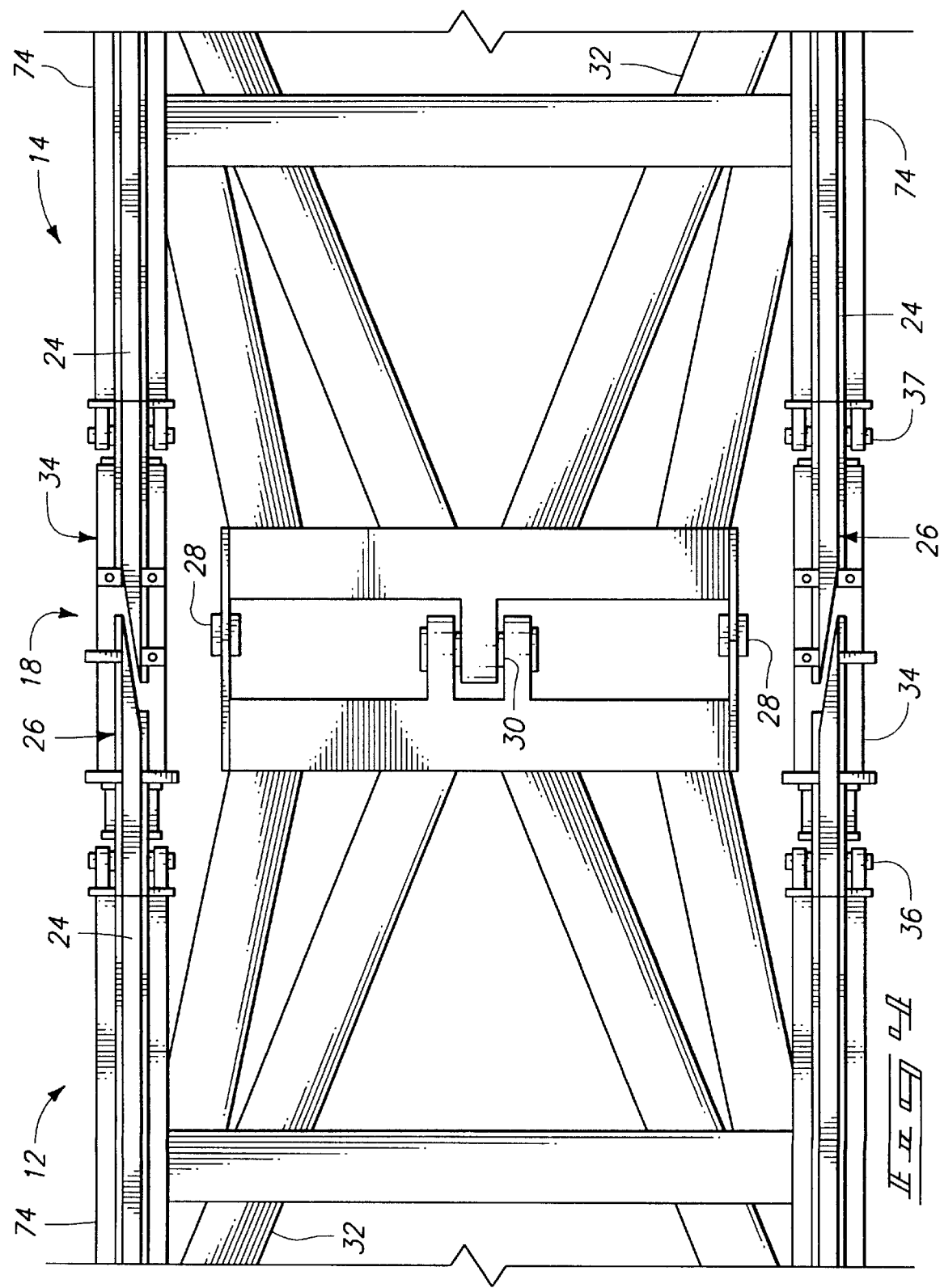

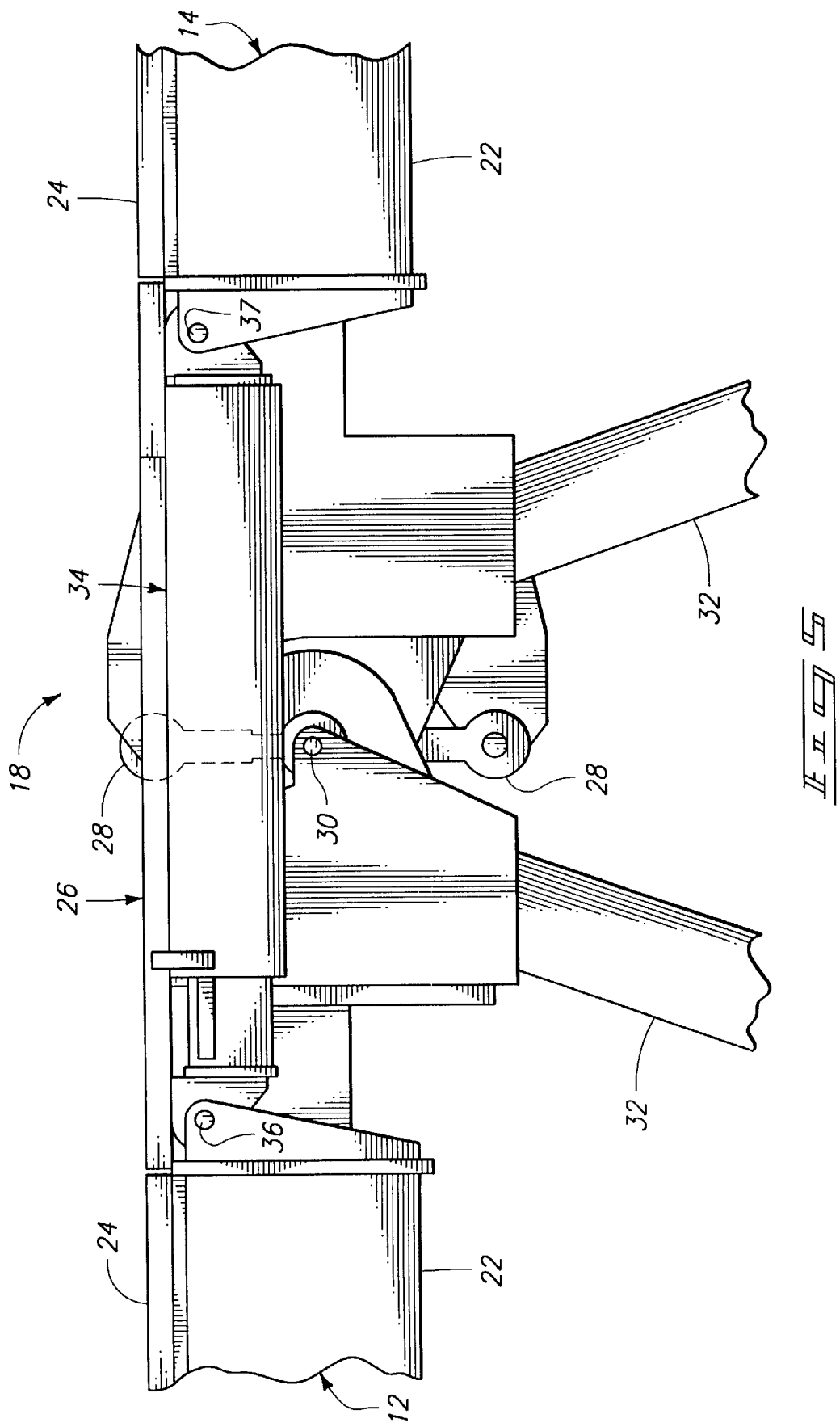

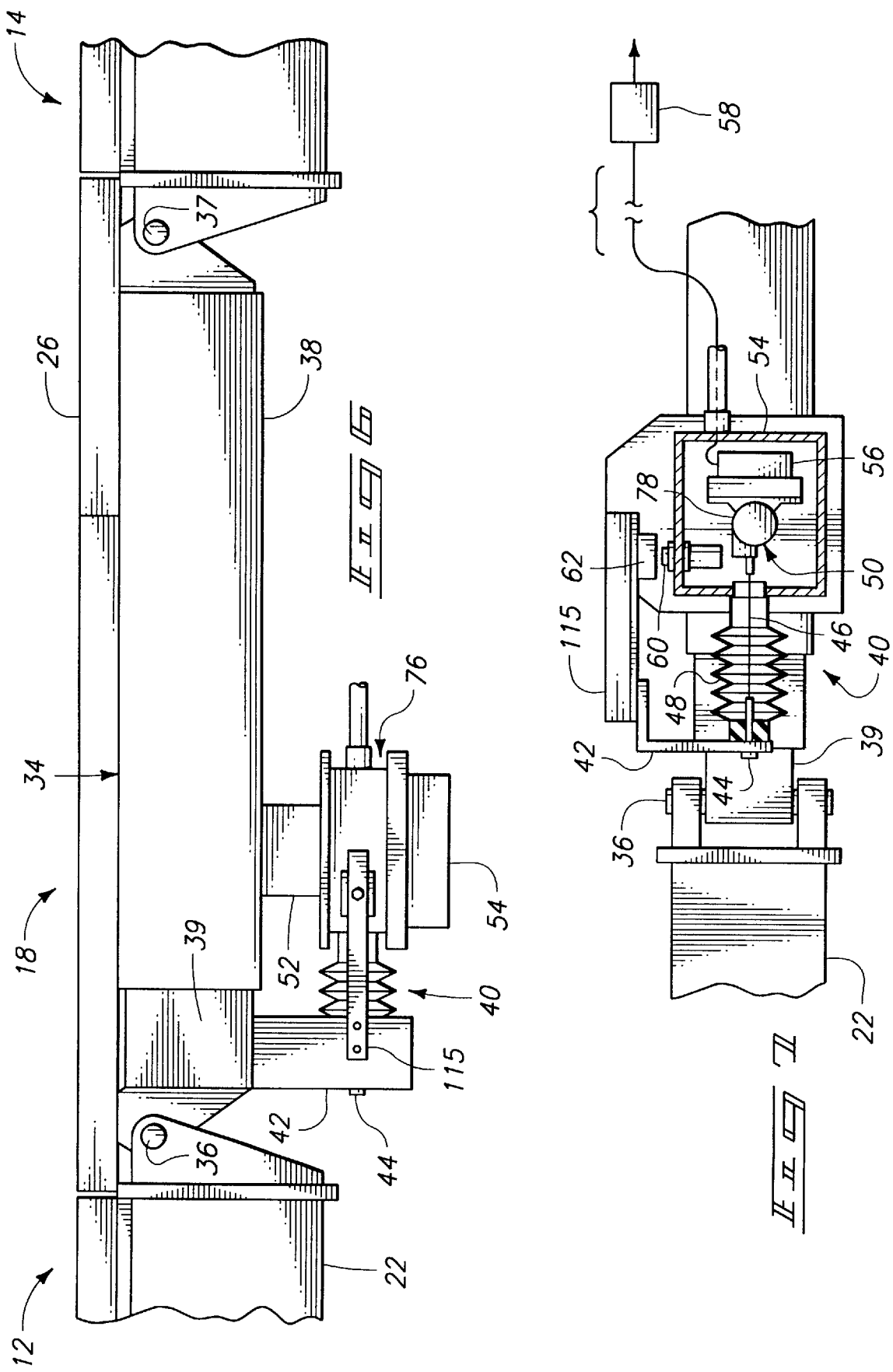

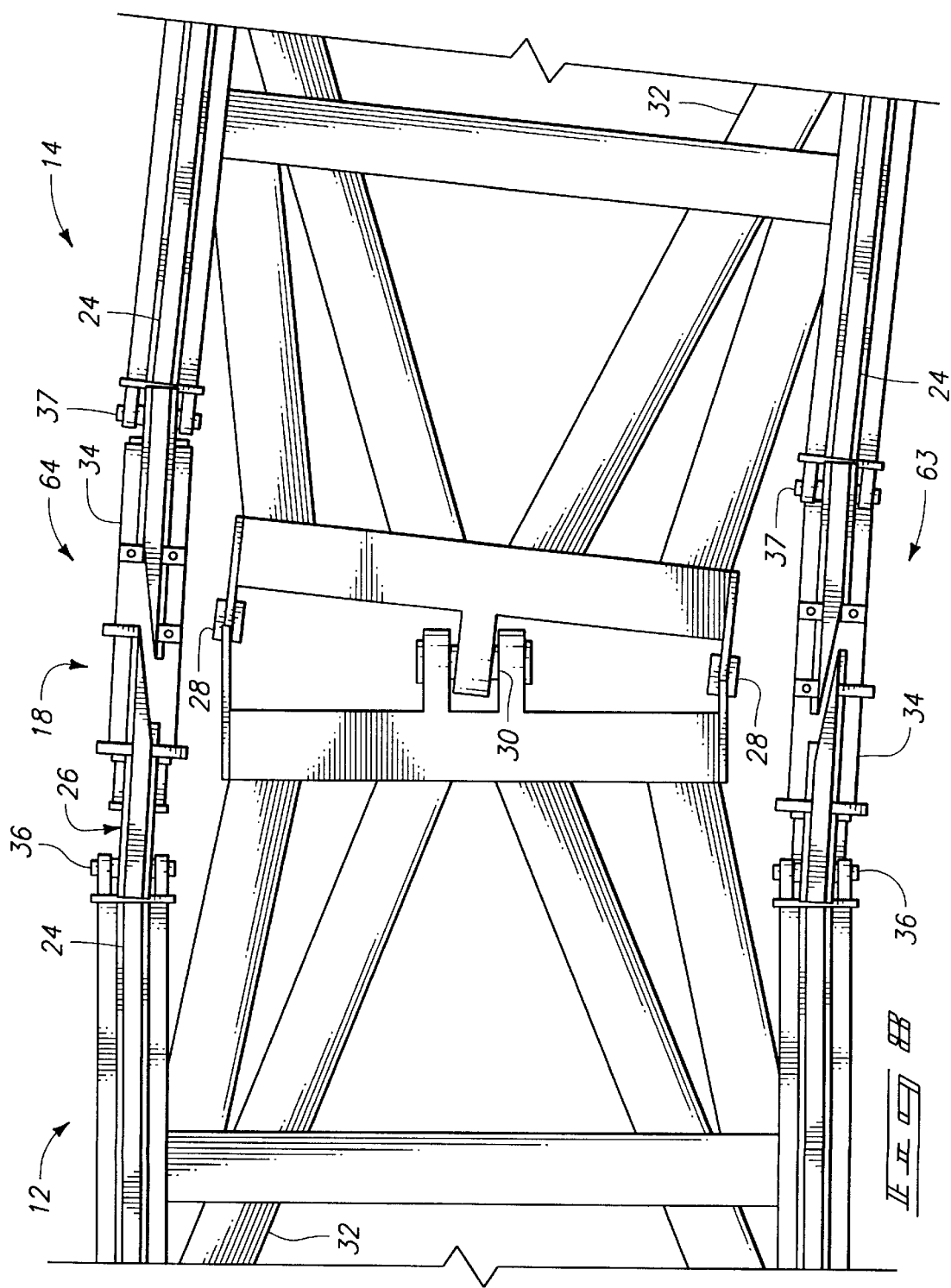

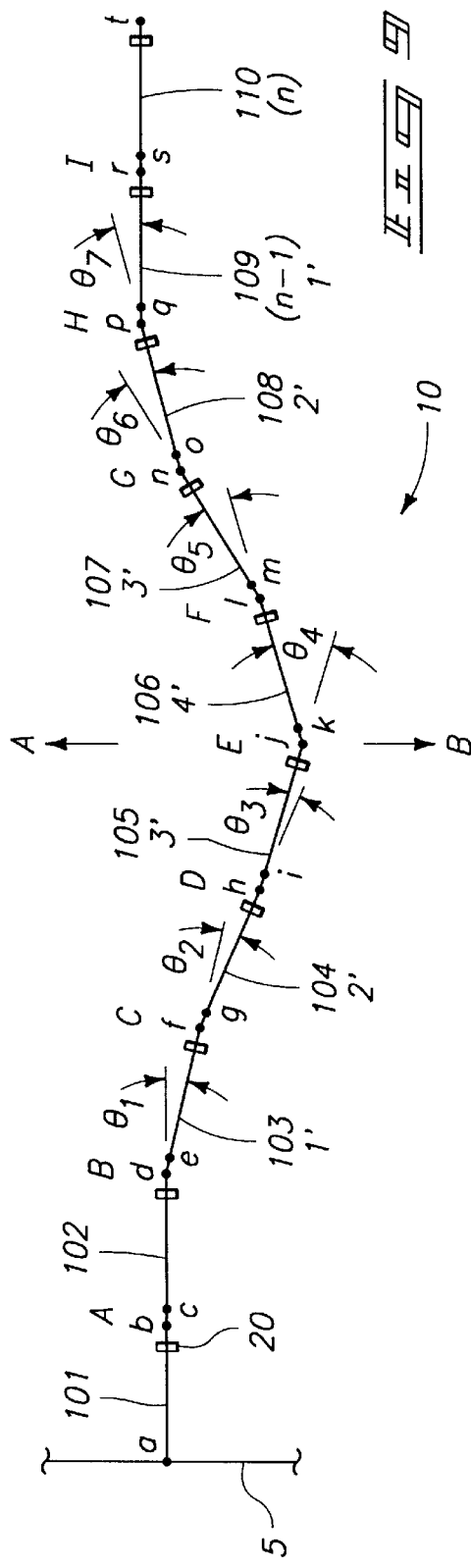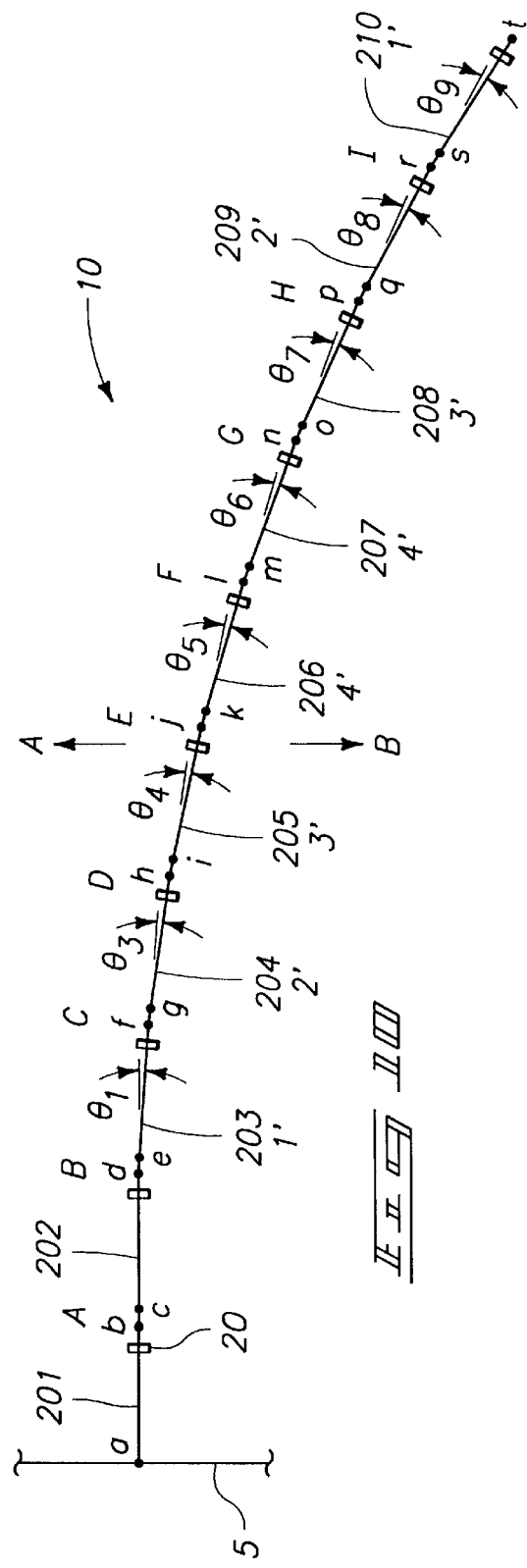

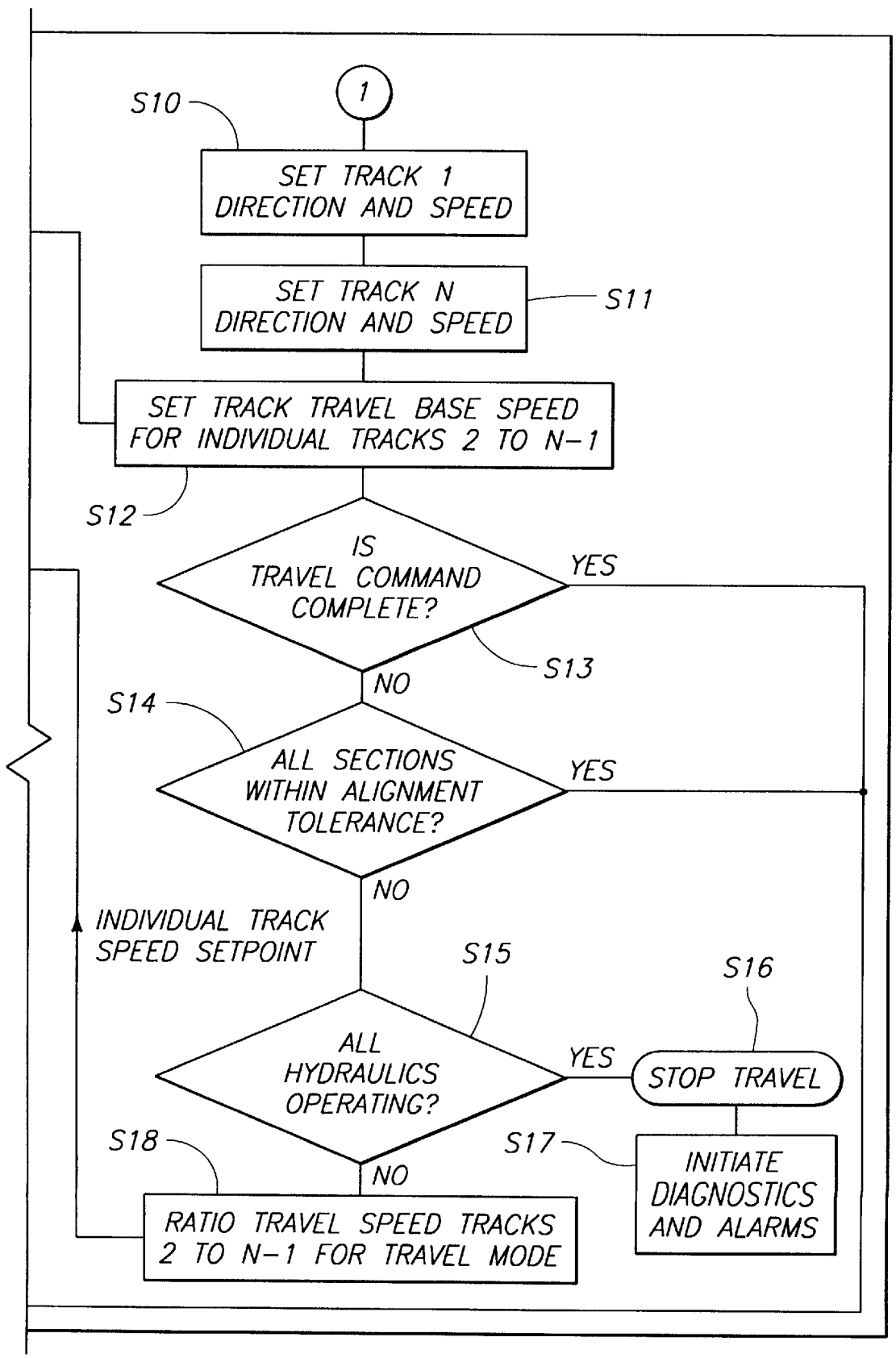

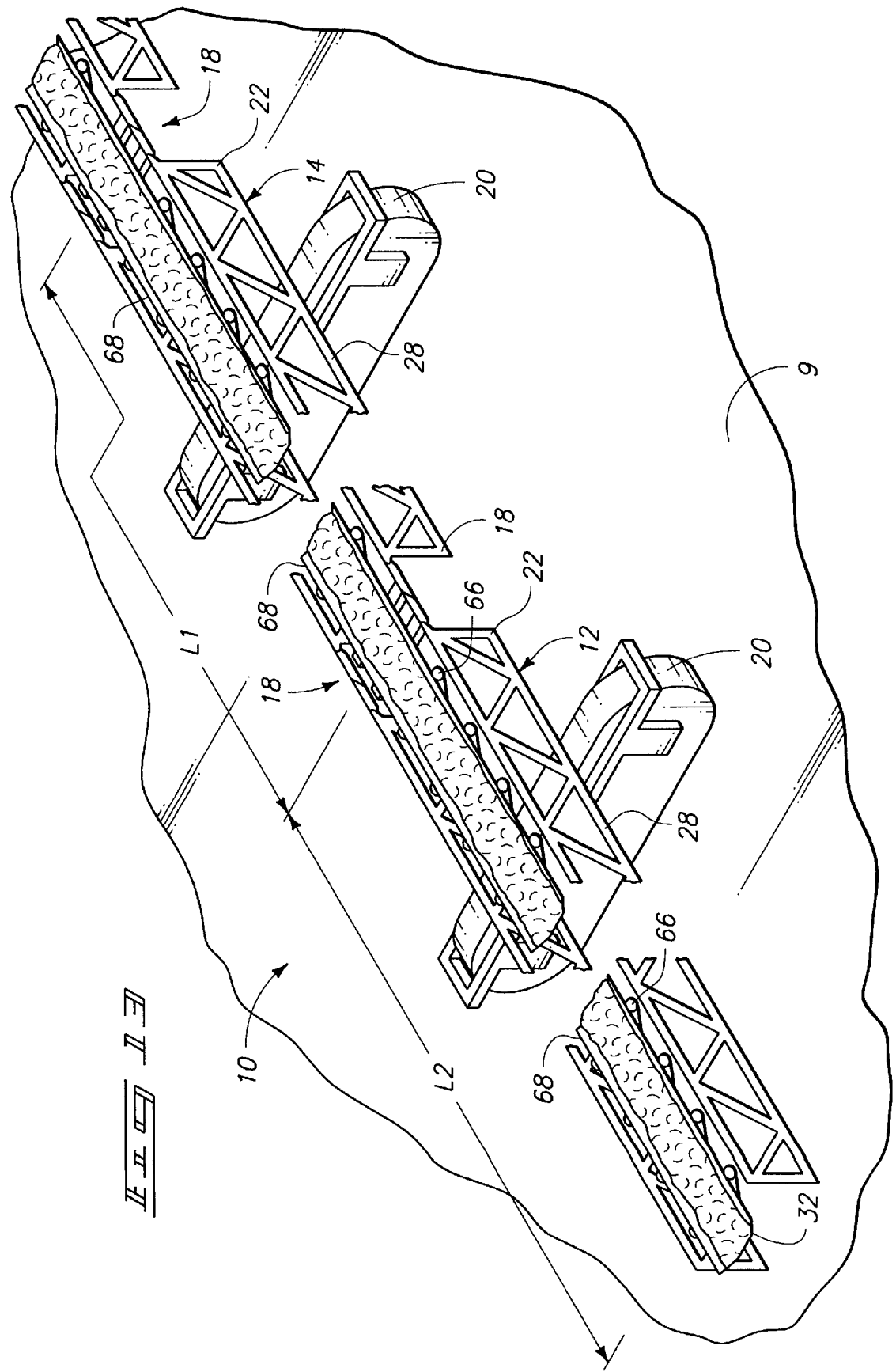

MOBILE CONVEYOR INCLUDING ADAPTIVE ALIGNMENT SYSTEM

TECHNICAL FIELD

This invention relates to articulated mobile conveyors. More particularly, the invention relates to multi-segmented articulated mobile conveyors having speed-adaptive alignment systems.

BACKGROUND OF THE INVENTION

Articulated mobile conveyors are used for various purposes, such as in mining, or in agricultural harvesting. For example, the conveyors can be used for excavating, stacking, or reclaiming material such as ore, coal, granite, clay, salt, potash, or other bulk material. Certain mobile conveyor systems are made up of a plurality of articulated sections or segments. The sections are joined to one another using, for example, ball joints. This enables rotational translation of one section relative to another in view of grade changes in the ground over which the sections lie. This also provides flexibility between segments when the conveyor is moved. Each section supports an endless loop belt which transports material over the length of the entire conveyor. Each section of the conveyor is separately movable relative to the ground and includes, for example, tracks or wheels in contact with the ground below the section, typically located at the end of the section. Each section typically has a dedicated drive unit for moving the section relative to the ground, the drive unit typically being independently steerable and operable to allow one section to be moved relative to an adjacent section. Thus, the entire conveyor can be moved or transported by activating a plurality of the drive units simultaneously. Such may be done for example when it is desired to harvest or mine in a different location, or when it is desired to transversely move the conveyor as material is stripped away from the surface of the earth or is moved from large storage piles. For examples of such articulated mobile conveyor, see the following patents which are incorporated herein by reference: U.S. Pat. Nos. 4,206,840 to Hanson; 4,031,997 to Nelson; and 3,361,248 to Daymon.

If While moving the conveyor relative to the ground, it may be desirable to longitudinally align two or more adjacent sections. See, for example, U.S. Pat. No. 3,422,949 to Bankauf (incorporated herein by reference). Bankauf discloses a guide follower which, upon too much misalignment, activates a hydraulic system to cause steerable wheels to turn. If left uncorrected, misalignment may cause the continuous belt or the tripper (used to transfer material from the belt to a secondary belt) to disengage from the conveyor assembly.

After moving the conveyor, it may be desirable to align two or more adjacent sections relative to one another such that the endless belt extends along a straight line in a common vertical plane, such as for better belt training from one section to the next. Some alignment mechanisms employ a series of pulleys and cables connected to each adjoining section for determining when precise longitudinal alignment has been reached. U.S. Pat. No. 3,897,640 to Swisher, Jr. et al. (incorporated herein by reference) discloses a conveyor including an alignment switch and a sensor connected to the alignment switch for correctingly moving the conveyor to maintain the position of the conveyor at a predetermined alignment position.

One alignment system, which is an improvement over such systems involving pulleys and cables, is described in U.S. patent application Ser. No. 08/508,125, filed Jul. 27, 1995, titled "Mobile Conveyor Including Alignment System" assigned to the assignee hereof and incorporated herein by reference.

Multi-segmented conveyor systems are typically aligned using the endpoints of the conveyor system as reference points. Thus, when segments intermediate the endpoints fall out of alignment in a direction opposite to the direction of travel, they need to "catch up" to the rest of the conveyor system to be brought back into alignment. In order to insure that there would always be some additional capacity to allow such segments to "catch up" to the endpoints, the transmissions or "transfer boxes" at the endpoints would be geared such that the endpoints could never travel faster than the overall system design. The system design speed would thus be available only to the intermediate segments to allow them to "catch up" to the rest of the conveyor system. This is undesirable since the conveyor system would never be able to travel overland at its true design capability.

It is thus desirable to provide an alignment system having increased accuracy over prior art systems, and which does not impose constant velocity constraints on the conveyor system.

BRIEF DESCRIPTION OF THE DRAWINGS

Preferred embodiments of the invention are described below with reference to the following accompanying drawings.

FIG. 2 is a plan view showing one complete segment of the conveyor system and partial views of the adjacent conveyor segments which are joined at the joints.

FIG. 3 is a front elevation view of the conveyor segment of FIG. 2.

FIG. 4 is a detail plan view showing the joint between conveyor segments.

FIG. 5 is a front elevation detail showing the tripper bridge at a joint in the conveyor system between two adjacent conveyor segments.

FIG. 6 is a front elevation detail showing the mounting of the sensor system to the tripper bridge at the joint in the conveyor system between two adjacent conveyor segments.

FIG. 7 is a bottom plan view of the sensor system shown in FIG. 6.

FIG. 8 is a plan view showing a joint between two adjacent conveyor segments of the conveyor system wherein the joint is articulated 6 degrees.

FIG. 9 is a schematic diagram showing a plan view of the conveyor system of the present invention wherein the various segments are out of alignment.

FIG. 10 is a plan schematic diagram of a conveyor system of the present invention wherein the conveyor segments are out of alignment in a continuous curving direction.

FIG. 11 is a panel showing the relationship of the two panels of FIGS. 12A and 12B which show a block diagram of a control logic for a control system used to implement the method of the present invention.

FIG. 13 is an isometric diagram showing conveyor segments of the present invention connected at joints in the conveyor system.

DETAILED DESCRIPTION OF THE PREFERRED EMBODIMENTS

Figure 1:
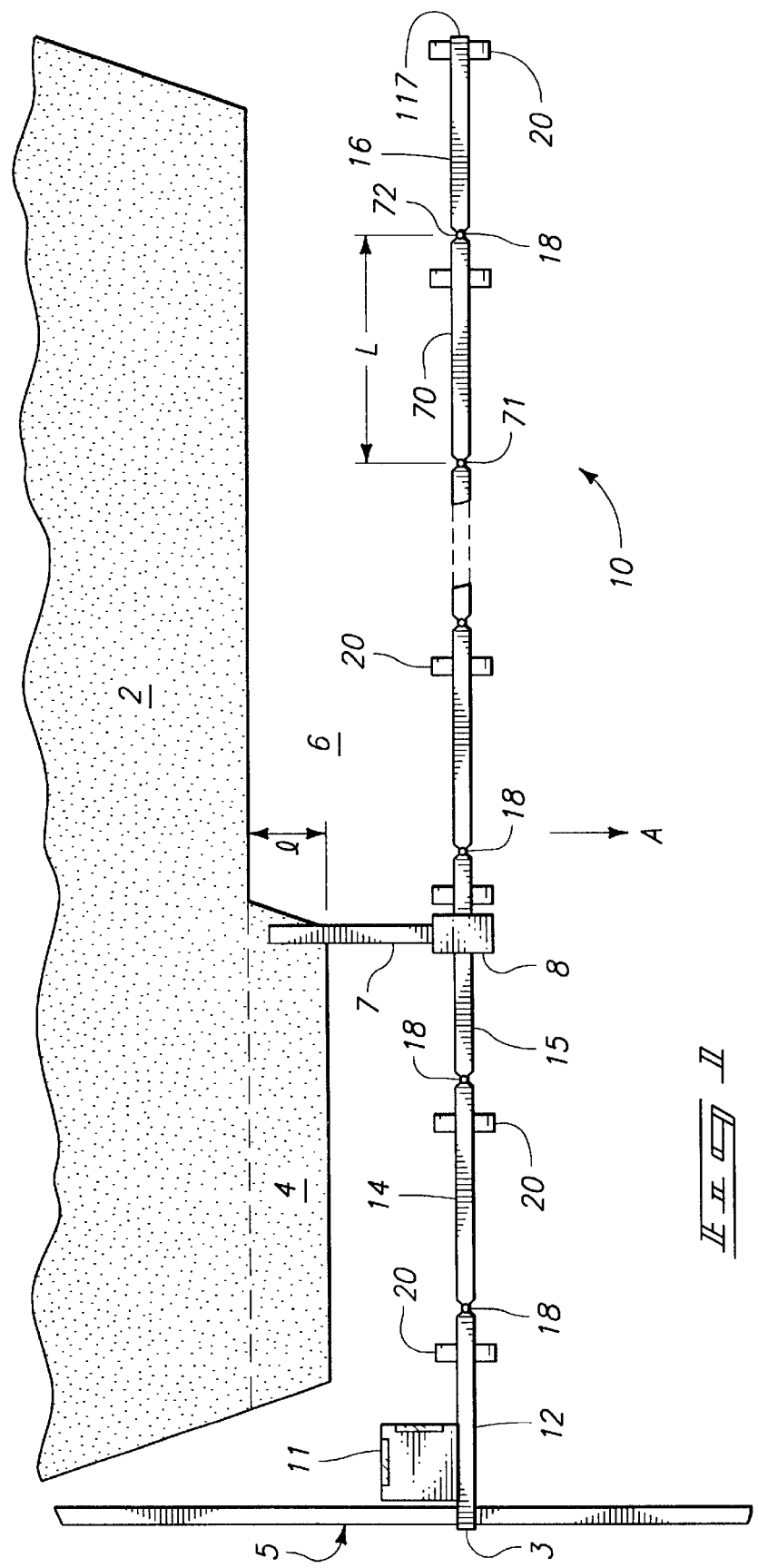
FIG. 1 is an environmental plan view schematic showing the conveyor system of the present invention.

The invention comprises a method for aligning a mobile material transport system such as a conveyor system, the mobile material transport system comprising a plurality of segments connected at adjacent articulable joints and mounted to individual drive units. In the method each joint is surveyed to determine whether it is out of alignment. The extent of misalignment at each joint is measured and joints having misalignment measurements exceeding a predetermined acceptable misalignment value are identified as joints which need alignment corrections. The maximum misalignment present in the conveyor system is identified. The maximum velocity at which the overall conveyor system may travel is then limited based on the maximum misalignment present.

One method for limiting the overall conveyor travel speed is to scale the velocity of the system to the amount of error present at the joint, using the maximum misalignment which may be measured at a joint as the outer limit of potential misalignment. This limiting of the overall travel speed is done to ensure that out-of-alignment segments can move at a faster rate than the bulk speed of the conveyor system, and thus be brought into alignment with the conveyor system. The velocity for each joint (segments at joints, actually) is calculated based on the misalignment at each such joint and the velocity limit for the system. Segments at joints which have a high degree of misalignment are repositioned faster than segments at joints with a lesser degree of misalignment to generally bring all segments into alignment at the same time. The method is repeated continually at a fast rate (for example, every 200 milliseconds) to smoothly adjust the speeds of the various segments such that they converge on a zero-differential velocity when the segments approach alignment. The system is thus properly identified as an adaptive system, since the velocities of the joint are adapted based on the degree of misalignment of the joint and the overall limit on velocity of the conveyor system.

The invention further includes a mobile material transport system having a plurality of segments and articulable joints connecting adjacent segments to produce an extended system. Each segment is provided with a drive unit to move the segment over a surface on which the transport system is supported. Each joint is provided with a sensor system to measure the amount of articulation at each joint. The transport system is further provided with a control system for aligning the segments of the transport system. The control system implements the method described above. The control system receives signals from each sensor system and produces a drive unit control output signal which is used to control the speed of the drive units in order to bring the segments of the material transport system into alignment.

The invention further includes an aligning apparatus for aligning a mobile material transport system, the transport system having a plurality of segments and articulable joints connecting adjacent segments to produce an extended system, each segment having a drive unit to move the segment over a surface on which the transport system is supported, the apparatus including a sensor system located at each joint to measure the amount of articulation or misalignment at the joint. The apparatus further includes a control system for aligning the segments of the transport system in response to the amount of misalignment at each joint. The control system receives signals from the sensors and processes them in a signal processor in accordance with the method for aligning a multi-segmented material transport system, as described above. The signal processor produces a drive unit control output signal which is used to control the speed of the drive units in order to bring the segments of the material transport system into alignment.

FIG. 1 shows a plan view of a typical conveyor system to which the present invention may be applied. A mobile conveyor 10 is provided material from an overland conveyor 5. The overland conveyor may receive material from a mine or the like. The mobile conveyor 10 may be a mobile stacking conveyor ("MSC") which is used to deposit material in organized stacks, or a mobile reclamation conveyor ("MRC") which is used to return material from a stack to a location such as an open pit mine in post mining reclamation activities. In FIG. 1 an MSC is shown. The mobile conveyor 10 receives material from the overland conveyor 5 at transfer point 3, which may be a tripper (a known apparatus for transferring material from a first conveyor to a second conveyor). The mobile conveyor 10 is typically configured to move in direction "A" (or in an opposite direction), or, in some cases, to rotate about transfer point 3. Control of the mobile conveyor system may be provided by an operator from an operator control house 11 which is typically mounted to the mobile conveyor.

Material from mobile conveyor 10 is transferred to the discharge conveyor 7 (in an MSC configuration) where it is then discharged into a pile. The discharge conveyor may be replaced with a material reclamation conveyor which is provided material by a mining shovel or the like, which would be the case in an MRC application. In either event, the conveyor 7 is configured to move along the length of the mobile conveyor 10. Tripper 8 provides for transfer of material to discharge conveyor 7 in an MSC application. In a reclamation application, the conveyor 7 may discharge material onto the belt of the mobile conveyor 10 without need of a tripper. In either application, a machine connection is to be provided to allow conveyor 7 to interface with, and move along the length of, in a connected manner, the mobile conveyor 10.

Mobile conveyor 10 typically comprises a plurality of segments or sections 12, 14, and so on through the last or end segment 16 (also known as the $n^{th}$ segment, or segment n). An exemplary segment 70 is shown in FIG. 1 having a first end 71 and a second end 72, the ends defining a conveyor segment length L. Although typically each segment in the conveyor system 10 will be of identical length, there is no requirement that this be so. The segments are joined at articulable joints 18. Each segment is typically provided with a drive unit 20. Drive unit 20 may comprise wheels, tracks (such as a caterpillar type track), or other known apparatus for moving machinery over land. Due to the typically heavy weights of mobile conveyors, tracks are most commonly employed. The tracks may be powered by local electric motors or, more commonly, by hydraulic drive units. A hydraulic drive unit normally comprises a hydraulic pump, a hydraulic fluid reservoir, and hydraulic connections to connect the hydraulic pump to the reservoir and the power unit. In the present invention, when a hydraulic drive unit is employed, the conveyor system preferably further comprises a hydraulic control system to control the supply of hydraulic fluid to each hydraulic drive unit.

While shown as having a plurality of segments in FIG. 1, the present invention may work with any conveyor system having two or more articulated segments. Often such conveyor systems may have 15 segments or more.

FIG. 13 is an isometric diagram of a portion of the conveyor system 10. The diagram shows a portion of first segment or section 12 and second section or segment 14 joined at joint 18. Each segment has a frame 22 to which is mounted the drive unit 20 which is used to transport the conveyor system 10 over the ground 9. The conveyor 10 further includes rollers 66 mounted near the upper portion on each conveyor section, and a material carrying flexible member, such as belt 68, supported by the rollers 66. The conveyor system includes an appropriate drive means or motor (not shown) for driving the flexible member 68 around a loop defined by the combined length of joined conveyor sections.

Joints 18 are configured to allow adjacent segments to articulate with respect to one another within an essentially horizontal plane (i.e., within the plane as viewed in the plan view of FIG. 1). A small degree of articulation is desirable to allow the system to flex without damaging the conveyor system. Mobile conveyors may be a half a mile or more in length, and weigh millions of pounds when loaded. The surfaces they travel over may not be well compacted or may have slopes and undulations. All of these conditions can impart differential stresses to the mobile conveyor. Such stresses will cause deflection and deformation in the conveyor. Without articulation points, the deflections and deformations would still occur, but they would most likely be in the form of bending of structural components. Such bending can damage and fatigue the conveyor frame, and cause machine components to seize. Thus, a completely rigid mobile conveyor is impractical and undesirable, and hence the need for the articulation points.

In addition to articulation in the horizonal plane, articulation in the vertical is also important. Such vertical articulation typically does not result in disengagement of the material transport belt or the tripper, and may thus go uncorrected over relatively large angles. It is articulation in the horizontal which typically results in operational problems and should therefore be controlled to reduce the amount of articulation. Joint connections 18 may comprise ball-joints or pin joints having flexible bushings about the pins to allow a limited degree of articulation in one direction, while allowing greater articulation about the axis of the pin. Such connections are preferable in the present invention to allow limited articulation at the bushing in the horizontal plane, and much greater articulation or rotation about the pin in the vertical plane.

In addition to the two degrees of articulation addressed, one segment of the mobile conveyor may rotate along the major axis of the conveyor with respect to the adjacent segment. Such may be the case where small, local undulations in the surface are encountered. This rotation may be better described as twisting or torquing of the segments. Such torquing may result in derailment of the tripper, and is therefore preferably reduced. Known devices may be employed to reduce torquing to an acceptable extent, but not eliminate it altogether.

FIG. 2 shows an enlarged plan view of conveyor segment 14 and adjacent segments 12 and 15, and the joints 18 connecting the segments. The crawler track assemblies (drive unit) 20 are shown located near the distal end of each segment proximate the joint 18. Turning to FIG. 3, a side elevation view of the conveyor segments shown in FIG. 2 is provided. The location of the drive units (shown here as crawler track assemblies 20) are clearly shown, as well as the articulable joints 18. Supported atop the segments on frame 22 are tracks 24 on which the tripper 8 of FIG. 1 rides.

Turning now to FIG. 4, a detailed plan view of the joint 18 disposed between, and connecting, segments 12 and 14 of FIG. 2 is shown. Tripper rails 24 are shown supported by upper frame members 74. At the joint 18 a tripper bridge 34 supports sliding tripper rail assembly 26 at either side of the conveyor segment. Sliding tripper rail assembly 26 allows the rails to follow a slight amount of flexure at the joint 18, allowing the tripper to progress smoothly along the conveyor assembly notwithstanding slight misalignment of adjacent segments. Turning briefly to FIG. 8 a highly exaggerated flexure at joint 18 is shown for the purpose of illustrating how the tripper sliding rails function when the joint 18 is articulated. The angle of articulation shown in FIG. 8 is 6 degrees; in typical applications the maximum articulation will be more on the order of 1.5 degrees. Returning to FIG. 4, the point of articulation 30 is shown, being the point about which the segments 12 and 14 may articulate with respect to one another. The coupling at articulation point 30 may comprise a ball-and-socket type arrangement or, as shown in the figures, a bearing mounted in a flexible bushing. Torsion arm connections 28 act to restrict twist between the two segments, as described above.

Turning now to FIG. 5 a side elevation view of the detail of joint 18 shown in FIG. 4 is provided. Tripper rails 24 and tripper rail slide assembly 26 are shown. The articulation point 30 is shown, allowing articulation in the vertical (i.e., allowing segments 12 and 14 as shown in the side view of FIG. 5 to move clockwise and counterclockwise slightly with respect to one another). The flexible bushing at the articulation point 30 allows articulation in the horizontal plane. The tripper bridge assembly 34 is connected to segment 12 by first tripper bridge pivot point 36 and to segment 14 by second tripper bridge pivot point 37. Tripper bridge pivot points 36 and 37 allow the tripper bridge assembly to accommodate the vertical articulation of the conveyor segments but, more importantly, accommodate horizonal plane articulation, as indicated in FIG. 8. Tripper bridge pivot points 36 and 37 may comprise bearings mounted in flexible bushings to accommodate both horizontal and vertical plane articulation.

Second conveyor segment 14 through end conveyor segment 16 of FIG. 1 are typically essentially identical; first conveyor segment 12 is similar to second segment 14 with the exception that first segment 12 is typically not configured to articulate at transfer point 3.

The conveyor 10 further includes an aligner or alignment system for aligning adjacent conveyor sections, such that the segments are aligned along their lengths in a preferably straight line. While other systems could be employed, the illustrated aligning system comprises one or more sensor assemblies 40 as shown in FIG. 6. FIG. 6 is a detail of the joint 18 shown in FIG. 5. The tripper bridge assembly may comprise a sliding tube configuration wherein a first square tube 39 which is attached to first conveyor segment 12 at first tripper bridge pivot point 36 slides within a second square tube 38. Second tube 38 is attached to second conveyor segment 14 at second tripper bridge pivot point 37.

Representative sensor assembly 40, shown in FIG. 6, includes a housing 76 having a removable cover 54, and a string pot sensor (not shown in FIG. 6) mounted in the housing. The housing 76 is preferably weather resistant. FIG. 7, which is a bottom plan view of the sensor assembly 40 of FIG. 6 with the sensor housing cover 54 removed, shows the string pot sensor 50. The string pot sensor 50 includes a main body 78, and a string or cable assembly including a retractable cable 46. Retractable cable 46 deploys from or into sensor main body 78 at a first end and terminates at, and is secured at, a distal or second end by string anchor 44. The retractable cable 46 can be partially pulled out of or retracted into the main body 78, and provides an indication of the lineal distance between string anchor 44 and the string pot main body 78, based on the amount of cable 46 deployed from the main body.

Returning to FIG. 6 it is seen that the string anchor 44 is connected to anchor bracket 42 which is itself rigidly attached to inner tube 39 of the tripper bridge assembly 34. Sensor housing 76, to which the string pot main body 78 is rigidly attached, is attached to tripper bridge outer tube 38 by sensor mounting bracket 52. The sensor assembly is preferably mounted beneath the tripper bridge assembly 34 to protect it from debris which may fall from the material transport belt located above it. More preferably the string sensor 50 is located such that the string 46 passes through a horizontal axis passing through the point of articulation 30. Locating the string pot sensor thusly will minimize displacements of the string due to vertical articulation of adjacent conveyor segments. Preferably string 46 is sheathed in flexible bellows 48 as shown in FIG. 7 to protect it from dirt and damage. The distal end of string 46 at string anchor 44 is thus moveable with respect to first conveyor segment 12, while the string first end at body 78 is moveable with respect to second conveyor segment 14. Thus, as first conveyor segment 12 articulates in the horizontal plane with respect to second conveyor segment 14, the string 46 in string pot sensor 50 will either be deployed from or retract into the main body 78 of the sensor. For example, for the clockwise articulation of conveyor segment 14 relative to segment 12 shown in FIG. 8, string in a sensor assembly mounted to the joint 18 on the side 63 of the conveyor system will retract into the main body. Likewise, a sensor assembly mounted to the joint 18 on the side 64 of the conveyor system opposite the point of articulation 30 will be deployed from the main body of the sensor. In one example wherein the centerlines of the tripper rails are spaced 2.5 meters (98 inches) apart, a 1.5 degree articulation results in a displacement of 3.25 cm (1.28 inch) at the centerline of the tripper rails (approximately the location where the string is preferably positioned). Further, since the string pot may be initially calibrated to a zero degree articulation position between adjacent conveyor segments, it is possible to determine if the string is being deployed from the main body of the sensor past the calibration point (indicating relative movement between conveyor segments in a first direction), or whether it is being retracted into the main body past the calibration point (indicating movement in a second direction opposite the first direction). In like manner, the sensor can be considered to general positive and negative signals, depending on which direction the string is moved past the calibration point.

In the preferred embodiment, two sensor assemblies 40 are used, one on each side of the conveyor, i.e., one sensor assembly mounted from each tripper bridge 34 at each joint 18. Such a two-sensor configuration is known as "differential mode", versus a single sensor configuration "single mode". The advantage of two sensors is that the two measurements can be added together to double the sensitivity of the system. Since ideally the measurements obtained from two sensors at a joint should be equal and opposite (assuming the sensors are both mounted the same distance from the point of articulation 30), the absolute values of the two measurements will need to be added to prevent one signal from canceling out the other. In addition, having two sensors will allow any string displacement error due to relative twisting of adjacent conveyor segments to be accounted for and removed. This is possible since displacement from twisting or torquing will produce the same positive incremental signal at both sensors. Since one sensor generates a positive signal due to horizontal articulation, and the other sensor produces a negative signal due to horizontal articulation, the positive errors introduced at the sensors due to torquing will have a negating effect. That is, if the signal is "S" and the torquing error is "T", it is easily seen that (|S+T|)+(|–S+T|)=2S.

As previously discussed, if the string of the string pot sensor is aligned to pass through a horizontal plane containing the point of articulation, horizontal articulation should not produce any signal, and thus no special provisions need to be taken to address horizontal articulation as a point of signal error.

The sensor assemblies preferably include a proximity switch 60 as shown in FIG. 7. Proximity switch 60 is mounted to the sensor housing 76 and is thus fixed with respect to second conveyor segment 14. The proximity switch is activated by actuator 62 which is mounted to a actuator bracket 115 which is in turn attached to sensor anchor mounting bracket 42, and thus the actuator 62 is fixed with respect to first conveyor segment 12. When the articulation between first and second conveyor segments exceeds a predetermined maximum value (known as "over-travel"), the actuator 62 passes beyond the proximity switch 60, thus actuating the switch. Once actuated the switch may signal an alarm or stop the drive units to prevent damage to the conveyor system.

As indicated, the sensor assembly produces a signal in response to articulation of segments of the conveyor system. It is understood that each segment of the conveyor system joint is preferably provided with a sensor assembly as described above, and therefore a plurality of signals may be produced, each signal representative of the articulation present between segments at an associated joint. We have discovered a novel method to use these signals in a control system to align the conveyor. Thusly, the conveyor system described herein further includes a control system coupled to the string pot sensors, limit switches, and drive units for aligning the conveyor sections. The signals from the sensor assemblies (which signals will generally be known as "input signals") are preferably processed by a processor to produce output signals, which are typically signals sent to drive unit controllers or to alarms. The processor may be a microprocessor, provided the input signals are first converted into a digital form if they are generated as analog signals. Attenuation of the signal may also be necessary, or it may even be necessary to convert a signal from one physical form to another in order for the processor to use it (such as a pneumatic signal which needs to be converted to a digital electronic signal for use by a microprocessor). Without limiting the types of processors that could be employed, other examples of processors include component electronics and pneumatic or hydraulic systems. Preferably the signal processor is electronic to provide rapid response of the control system. The signal processor typically includes a memory for storing numbers such as calibration figures, intermediate calculation results, alarm values, and control constants for calculating output signals to be used to by control units, as for example the drive unit controllers.

The basic logic performed using the input signals (in direct or converted form) is that joints of the conveyor system are surveyed to identify misaligned joints. A joint is defined as being misaligned if the adjacent conveyor segments which comprise the joint are non-collinear along their major axis beyond an acceptable degree of non-collinearity, which typically will be defined by the angle between a first segment and a second segment of the conveyor system. FIG. 9 shows a misaligned conveyor system having angles of non-collinearity $\theta_1$ through $\theta_7$. In one example, an acceptable degree of non-collinearity is 0.25 degrees. Therefore, those joints whose non-linearity exceeds the minimum acceptable value will be identified as joints to be aligned, each such joint having an associated value or amount of non-collinearity. Hereinafter, when a joint, or conveyor segments, are referred to as "a misaligned joint" or "misaligned segments" it will be assumed that the joint or segments are misaligned beyond the minimum acceptable value of non-collinearity. The different amounts of non-collinearity at these misaligned joints is preferably measured using the output signal from the associated sensor system. This signal may need to be pre-processed such that it is compatible with the signal processor, as described above.

The measurements of non-collinearity are used to calculate velocities for a drive unit or drive units associated with a given joint to move the adjacent segments to bring them into alignment. The joint associated with the greatest amount of non-collinearity is adjusted by moving segments immediately adjacent thereto at a first rate of movement in order to bring them into alignment. Segments adjacent to joints having lesser amounts of non-collinearity are preferably adjusted by moving the associated segments at secondary rates of movement in order to reduce the amount of non-collinearity therebetween, such secondary rates of movement being less than the first rate of movement. Preferably, the secondary rates of movement are scaled to the first rate of movement based on a predetermined algorithm. More preferably, the algorithm will be a proportional-integral-derivative ("PID") control algorithm which is configured to adaptively adjust the velocities of misaligned segments such that all segments converge in alignment at approximately the same time. That is, if segments which are more out of alignment are moved at faster rates in order to bring them into alignment faster than those joints which are not as out of alignment, the tendency will be for all segments to become aligned at approximately the same time.

In order for the method to be most effective, it needs to be continually applied to the conveyor system such that the joints are continually being surveyed during the period of adjustment of the positions of the segments such that when the conveyor system approaches alignment, the relative velocities between segments approaches zero. Thus, the processor continually scans the signals being received from the sensors in order to receive new misalignment information from the joints, process the information, and adjust the rate of alignment at each joint. Such control is known as adaptive control or, more precisely, speed adaptive control. It is understood that a joint is aligned by providing an output signal to a drive unit controller (for example, a hydraulic control unit) for a segment associated with the joint to move the segment in a particular direction and at a particular velocity in order to bring it into alignment with the adjacent segment. Typically, there will only be one drive unit associated with a joint. For example, referring to FIG. 9, it is seen that at joints A, B, C, etc. only one drive unit 20 is shown at each joint. To align joints B, C, G and H, the drive units proximate to respective nodes d, f, n and p are preferably driven in the direction of arrow B; to align joints D, E and F, the drive units proximate to respective nodes h, j, and l are preferably driven in the direction of arrow A.

As described previously, there is usually associated with the conveyor system a maximum acceptable amount or quantity of misalignment beyond which the control system will not be applied. This point is established since the control system is designed to align the conveyor at quantities of misalignment much less than the maximum allowed quantity. When two segments become misaligned at or above the maximum allowable extent of misalignment, this indicates a physical problem exists with one or the other of the segments, such as failure of a drive unit or blockage of a drive unit by a physical object such as a pile of sand in front of a crawler track. When two segments become misaligned beyond the maximum allowable quantity, the system is provided with alarms to notify an operator or to take other automatic control steps such as shutting down the system. This is useful in preventing further damage to the system in the event of equipment failure or the like. Misalignment at or beyond the maximum allowed quantity is preferably indicated by proximity switch 60 of FIG. 7.

The travel speed of a drive unit at a joint determines the rate of adjustment of the joint. As previously indicated, the rates of adjustments, also known as rates of alignment, for misaligned joints are established based on an algorithm such as scaling or a PID scheme. The algorithm preferably increases or decreases the speed of drive units at misaligned joints to bring each joint into alignment with itself. For example, referring again to FIG. 9, if the conveyor system is traveling in direction "A" at a bulk velocity $V_b$, then the drive unit at node j will be increased to align joint E. In like manner, the velocity of the drive unit at node n will be decreased to align joint G. Contrariwise, if the conveyor system is traveling in direction "B", then the velocity of the drive unit at node j will be decreased to align joint E, while the velocity of the drive unit at node n will be increased align joint G. If in the first instance (travel in direction A) in order to ensure that the drive unit at node j may accelerate to a velocity which will allow joint E to be aligned in a reasonable amount of time, the bulk velocity of the conveyor system is preferably reduced to allow the drive unit at node j to generate sufficient velocity to align the joint, while keeping up with the rest of the conveyor system.

In the alignment algorithm, the velocity at each joint is determined not only by the direction of travel of the conveyor system and the direction of misalignment of the joint, as just described, but also based on the amount of misalignment at each joint. As a general rule, joints will be aligned at a rate proportional to their amount of misalignment. This may require accelerating or decelerating a joint relative to the speed of travel of the overall conveyor system, as just described. For example, in the case of travel in direction B in FIG. 9, if joint E is the maximum misaligned joint, it will be aligned fastest by reducing the velocity of the drive unit at node j. Since directions of misalignment may be determined by either a positive or negative signal from the sensors located at each joint as described above, it is possible to not only determine a rate at which segments are to be moved to align a joint, but also the directions that segments are to be moved relative to the overall direction of travel of the conveyor system. Moving segments in different directions relative to one another (and relative to the overall direction of travel) may be accomplished by decelerating a drive unit, by accelerating a drive unit, or, when the overall speed of travel is slow or zero, reversing the direction of travel of a drive unit.

Returning to FIG. 1, as was described earlier, the conveyor system 10 may be operated in a variety of modes. In one mode, the conveyor advances a distance l and stops while the discharge conveyor 7 moves from one end of the conveyor system to the other end, discharging material along the way, as for example in area 4. The conveyor system 10 then advances another distance l and reverses the direction of travel of the discharge conveyor 7. This continues until a fill area 2 has been completely filled or there is no more fill material at which time the direction of travel of the conveyor system 10 may be reversed or stopped altogether. Thus, it is preferable to have an alignment system which may align the conveyor system 10 both while the conveyor system is traveling and while the conveyor system is at rest.

For purposes of the following discussion, the following terms are defined: "bulk velocity" ($V_b$) is defined as the desired velocity as which the conveyor system 10 is to be moved in a given direction, either as controlled by an operator or as controlled by an automatic control scheme. Typically, the bulk velocity will be the average velocity of all of the segments in the conveyor system 10. However, due to rates of adjustment to bring segments into alignment, this is not precisely true. Typically, the bulk velocity will be set at the endpoints of the conveyor system, such as endpoints 3 and 117 of the conveyor system in FIG. 1.

We also define the term "maximum possible bulk velocity" ($V_{MAX}$) as the maximum possible speed at which the conveyor system 10 may be moved. We further define the term "maximum allowed bulk velocity" ($V_{max}$ or $V_m$) as the maximum bulk velocity for the conveyor system to move over the ground as limited by the control scheme or control system.

We have previously discussed the maximum allowable amount of non-collinearity ($ERR_{MAX}$) which may be detected at a joint, typically as limited by the sensor system. This quantity will also be known as the maximum detectable articulation. We have also previously discussed a minimum articulation value which is the amount of non-collinearity between segments which will be accepted without adjusting the adjacent segments to correct such non-collinearity. We have also previously discussed the maximum non-collinearity which may exist at any joint in the system at any time, and will also use that term interchangeably with the expression "maximum articulation value" or "greatest articulation value", all of which will be identified by the symbol "$Err_{max}$". Note that an articulation value is merely another expression for a measure of non-collinearity, and may be measured either in degrees, in lineal displacement, or in "counts" in the case of the output of a string pot sensor which is digitized. In the preferred embodiment, the string pot sensor is employed since it provides a lineal displacement which is easily measured in this application.

The following described control system was designed specifically to align a moving conveyor system, although it will be seen that the method also works perfectly well for conveyor systems at rest. In the preferred embodiment wherein the conveyor system may be moving at a bulk velocity ($V_b$) in a particular direction, for example in direction A as shown in FIG. 1, the control system preferably surveys each joint between adjacent segments in the conveyor system to identify misaligned joints, and the amount of misalignment at each such joint. The amounts of misalignment are preferably stored in a memory device. The maximum articulation value $Err_{max}$ is selected from the stored or measured misalignment values. If the measured amount at the maximum misaligned joint exceeds the maximum tolerable amount of non-collinearity, a special case interrupt procedure will be invoked as discussed above. However, in the normal case in which the maximum measured amount of non-collinearity is less than the maximum tolerable amount of non-collinearity, an error coefficient "A" is preferably calculated, wherein:

$$A=1-|(Err_{max}/ERR_{MAX})|. \qquad \text{(Eqn. 1.)}$$

The maximum allowed bulk velocity of the system $V_{max}$ is then calculated, wherein:

$$V_{max}=A \times V_b \qquad \text{(Eqn. 2.)}$$

This establishes a maximum speed at which the overall conveyor system may travel while it is being aligned. Establishing a maximum allowed bulk velocity will ensure that segments at which the velocity of the drive unit needs to increase to bring the segment into alignment can do so—that is, to ensure that there is some available speed to align those segments which need to accelerate to align yet are already traveling near the bulk velocity or maximum possible velocity of the system. However, to ensure that the overall travel speed of the conveyor system is not slowed down to the point where the material transferring operation of the conveyor system is hampered by the alignment control system, a limit is preferably established on $V_{max}$. For example, $V_{max}$ may be limited to being no less than 70% or 80% of $V_b$. This can be accomplished by setting a limit in Equation 1 such that if ($Err_{max}/ERR_{MAX}$) is >0.2, A is set equal to 0.8.

Once a maximum allowed bulk velocity ($V_{max}$) has been established, the next step is to establish the velocity for segments at each misaligned joint, which will be termed "$V_{ji}$" for "the velocity at joint i". Joints which are in alignment are limited to traveling at the maximum allowed bulk velocity. We define the amount of non-collinearity or the articulation value at each joint as $Err_{ji}$ or $ERR_i$, wherein the joints of the conveyor system are identified by the sequence j=1, 2, 3, . . . (i−1), i, (i+1), . . . (n−1), n. Again, joints whose articulation values do not exceed the minimum acceptable articulation value will not be aligned. Additionally, it should be noted that the velocity at the point of articulation of a joint is determined by the speed of the drive units at the associated adjacent conveyor segments. Calculation may be necessary to determine the actual velocity at the point of articulation, if desired, due to the distance between the drive unit and the point of articulation. Such calculations are merely a matter of determining the geometry of the system based on angles and distances between drive units and joints and calculating the velocity at the joint given the known velocities at the two nearest associated drive units.

The basic equation used to calculate the velocity at each joint is preferably, for an independent implementation:

$$V_{ji} = V_m + k_p Err_{ji} + k_{i'} \int_0^t Err_{ji} + k_d \frac{dv}{dt}(Err_{ji}) \quad \text{(Eqn. 3.)}$$

wherein each of the values of k is a constant calculated to align the conveyor system without overdamping or underdamping, and in fact to preferably achieve critical damping. The three different constants are:

$k_p$ is the proportional term constant or gain;
$k_i$ is the integral term constant or gain; and
$k_d$ is the derivative term constant or gain.

The selection of values for k may be done mathematically by Bode plots or the like, or may be done in the field by trial and error and previous experience. The value of k will further depend on physical constraints and dimensions of the conveyor system, drive units, and drive unit controllers, and will also include the appropriate conversion factors to convert the error measurement $Err_{ji}$ into the appropriate velocity units. The selection of values for k is an exercise well known in the field of control system design and implementation, and will not be discussed further herein. It might be considered that the PID term constitutes the calculation of a correcting velocity which is added to the limited velocity $V_m$ in order to allow the conveyor system to be brought into alignment.

In an alternate embodiment, comprising a dependent implementation, the equation used to calculate the velocity at each joint is:

$$V_{ji} = V_m + k_p \left[ Err_{ji} + \frac{1}{T_{i'}} \int_0^t Err_{ji} + T_d \frac{dv}{dt}(Err_{ji}) \right] \quad \text{(Eqn. 4.)}$$

where $k_p$ is the proportional term constant or gain;
$1/T_i$, is the reset gain; and
$T_d$ is the rate gain.

Note that $k_i$ is proportional to $k_p/T_i$, and $k_d$ is proportional to $k_p * T_d$.

In either implementation (dependent or independent), the derivative term $(dv/dt)Err_{ji}$ is used for rate control to control the rate of response of the system in response to changes in the setpoint of the system. We have selected $k_d$ (and $T_d$) as zero in practice, although it may be set to a non-zero value depending on response characteristics desired for the system.

As an alternative to the PID implementations described above, a time domain "sample-hold" or a feed-forward control scheme may be employed. These control schemes are well known in the art and will not be described further herein.

In the preferred embodiment, the conveyor system is aligned along the end points of the conveyor system. Turning to FIG. 9, the conveyor system 10 would thus be aligned along a line connecting point "a" and point "t". Point "a" represents the interface between overland conveyor 5 and the mobile material transport or conveyor 10. At least thirteen possible travel modes for the mobile conveyor exist, as will now be described.

With reference to FIG. 1, conveyor segment 12 may be considered the first conveyor segment and conveyor segment 16 may be considered the $n^{th}$ conveyor segment. Thus, the segments would be numbered in the series 1, 2, 3, ..., (n−1), n, going from left to right across the conveyor system 10 shown in FIG. 1. With reference to FIG. 1, two of the travel modes are: forward travel (for example in the direction of arrow A); and reverse travel (that is, travel in the direction opposite the direction of arrow A). For control system purposes, forward travel may be designated by a positive velocity $V_b$; reverse travel at an equivalent velocity is thus designated by a negative number, $-V_b$. That is, opposite signage is used for reverse travel. In this manner, the directions of travel, as well as the directions of error and error correction, are taken into account. This same approach can be sued for all travel modes.

Figure 14A:
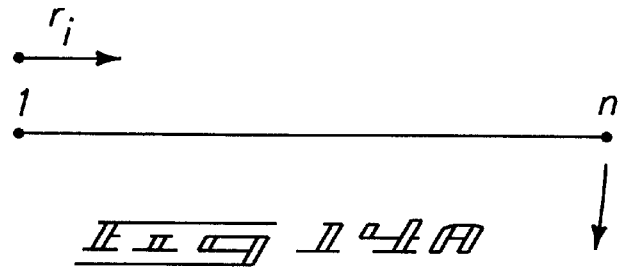
FIG. 14A is a plan schematic diagram of a conveyor system of the present invention showing clockwise rotation about a first end of the conveyor system.
Figure 14B:
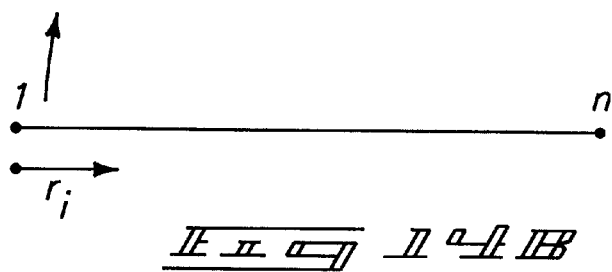
FIG. 14B is a plan schematic diagram of a conveyor system of the present invention showing clockwise rotation about a second end of the conveyor system.
Figure 14C:
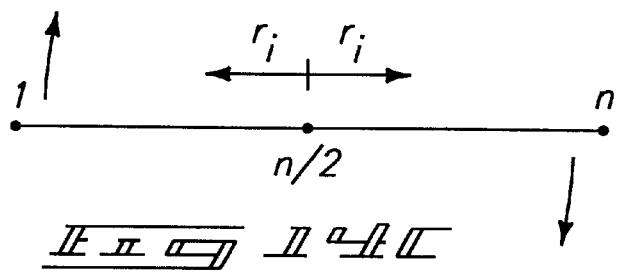
FIG. 14C is a plan schematic diagram of a conveyor system of the present invention showing clockwise rotation about the mid-point of the conveyor system.
Figures 14D, 14E:
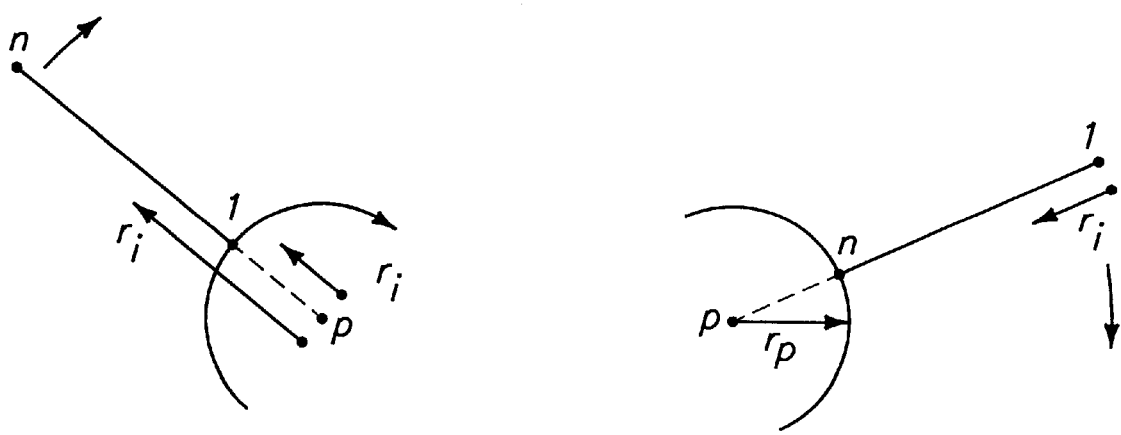
FIG. 14D is a plan view schematic diagram of a conveyor system of the present invention showing clockwise rotation about a point distal from the first end of the conveyor system.
FIG. 14E is a plan schematic diagram of a conveyor system of the present invention showing clockwise rotation about a point distal from the second end of the conveyor system.

With reference to FIG. 14A, a third and fourth travel mode are shown: rotate clockwise or rotate counterclockwise about the endpoint of the conveyor system at segment 1. With reference to FIG. 14B, a fifth and sixth travel mode are shown: rotate clockwise or rotate counterclockwise about the endpoint of the conveyor system at segment n. With reference to FIG. 14C, a seventh and eighth travel mode are shown: rotate clockwise or rotate counterclockwise around the middle conveyor segment or the middle track (that is, segment or track n/2). With reference to FIG. 14D, a ninth and tenth travel mode are shown: rotate clockwise or rotate counterclockwise around a point distal from the endpoint at track 1 of the conveyor system. With reference to FIG. 14E, an eleventh and twelfth travel mode are shown: rotate clockwise or rotate counterclockwise around a point distal from a the endpoint at track n of the conveyor system.

A thirteenth "travel mode" is the auto align mode in which the conveyor is not moving in any direction. Due to the great weight of the equipment and the fact that the surface over which the equipment moves is often not well compacted or may have sloping areas, the conveyor segments will tend to move relative to one another even when the conveyor is stationary. Therefore the conveyor system is preferably operated in the auto align mode when it is not traveling in any other direction.

For forward or reverse travel, the equation for the independent implementation of the control scheme is Equation 3 or 4. We can thus define the solutions for each joint for Equation 3 and 4 as "$V_{i-f/r}$", for "velocity at joint i, forward/reverse mode."

For travel in the mode shown in FIG. 14A (rotate clockwise about the endpoint of the conveyor system at segment 1), $V_f=0$, $V_n=V_m$, and the equation for the intermediate joints 2 through n−1 (independent implementation) becomes:

$$V_i = V_{i-f/r}\left(\frac{r_i}{r_n}\right) \quad \text{(Eqn. 5.)}$$

where $r_i$ is the radius from joint 1 to joint i, and $r_n$ is the radius from joint 1 to joint n, as shown in FIG. 14A.

For travel in the mode shown in FIG. 14B (rotate clockwise about the endpoint of the conveyor system at segment n), $V_f=V_m$, $V_n=0$, and the equation for the intermediate joints 2 through n−1 (independent implementation) becomes:

$$V_i = V_{i-f/r}\left(\frac{r_i}{r_1}\right) \quad \text{(Eqn. 6.)}$$

where $r_i$ is the radius from point 1 to point i, and $r_l$ is the radius from point 1 to point n, as shown in FIG. 14B.

For travel in the mode shown in FIG. 14C (rotate clockwise about the midpoint of the conveyor system at segment or track n/2), $V_1=V_n=V_m$, $V_{n/2}=0$, and the equation for the intermediate joints 2 through n−1 (independent implementation) becomes:

$$V_i = V_{i-flr}\left(\frac{r_1}{r_i}\right) \text{ where } 1 \le i \le n/2 \quad \text{(Eqn. 7.)}$$

and $$V_i = V_{i-flr}\left(\frac{r_n}{-r_i}\right) \text{ where } n/2 \le i \le n \quad \text{(Eqn. 8.)}$$

where $r_i$ is the radius from point n/2 to joint 1 or n (respectively), $r_1$ is the radius from point n/2 to point 1, and $r_n$ is the radius from point n/2 to point n, as shown in FIG. 14C.

For travel in the mode shown in FIG. 14D (rotate clockwise about a point a distance $r_1$ from endpoint 1 of the conveyor system), $V_n=V_m$, $V_l=(r_l/r_n)$, and the equation for the intermediate joints 2 through n−1 (independent implementation) becomes Equation 6. Note, however, that $r_i$ is the radius from point p to point n, and $r_n$ is the radius from point p to point n, as shown in FIG. 14D.

For travel in the mode shown in FIG. 14E (rotate clockwise about a point a distance $r_p$ from endpoint n of the conveyor system), $V_1=V_m$, $V_n=V_m(r_p/(r_n+r_p))$, and the equation for the intermediate joints 2 through n−1 (independent implementation) becomes:

$$V_i = V_{i-flr}\left(\frac{r_p + r_n - r_i}{r_n + r_p}\right) \quad \text{(Eqn. 9.)}$$

where $r_i$ is the radius from point 1 to point i, $r_n$ is the radius from point 1 to point n, and $r_p$ is the radius from point p to point n, as shown in FIG. 14E.

For counter-clockwise rotation in the case of FIGS. 14A through 14E, simply reverse the sign of $V_{i-flr}$.

In the following example to be described, it will be assumed that the conveyor system 10 of FIG. 9 is moving in the direction of arrow A. A schematic diagram shows a ten segment conveyor system with segments numbered 101 through 110. Between adjacent segments are joints which are identified by letters A through I. Each misaligned joint is further identified by an angle θ, and in the example shown misaligned joints are identified by angles $\theta_1$ through $\theta_7$. Drive units 20 are also identified for each conveyor segment and will be identified by the node closest to the drive unit. For example, the drive unit at node C will be identified as drive unit f. Each joint is further identified by two nodes which are identified in lower case letters starting with joint A which is identified by nodes b and c ending with joint I identified by nodes r and s. Generally, the conveyor segments are identified by numbers 1 through n where conveyor segment 101 would be identified with segment 1 and conveyor segment 110 would be identified by segment n. Conveyor segment 109 is thus identified as conveyor segment (n−1).

The schematic of FIG. 9 shows highly exaggerated misalignment of the conveyor system which is merely used here for illustrative purposes. Such a misalignment may occur for example where the ground in the middle portion between points a and t is softer or is slumping in a downhill direction away from the direction of travel A, thus allowing gravity to pull segments 103 through 108 away from the main line of alignment for the conveyor system 10.

The control system preferably first scans all segments of the conveyor system to identify those segments which are out of alignment. If the misalignment value measured at a joint is less than the minimum acceptable amount of articulation, then that joint will not be aligned by the control system. For example, in FIG. 9 if the minimum acceptable articulation value is greater than $\theta_6$, then segments 107 and 108 will not be adjusted to reduce $\theta_6$. More specifically, the drive unit at segment 107 will not have its speed adjusted for the purposes of aligning the joint G.

The amount of misalignment at "misaligned joints" is next preferably measured and recorded or stored into memory. The largest misalignment value is then preferably identified. In the example shown, segments 105 and 106 defining joint E have a misalignment of $\theta_4$ which for exemplary purposes will be identified as the maximum amount of misalignment. Assuming that $\theta_4$ does not exceed the maximum tolerable amount of misalignment, the system proceeds with correcting the alignment at the joint rather than alarming to notify an operator or stopping the system.

The maximum allowable bulk velocity $V_{max}$ or $V_m$ is then calculated preferably using Equations 1 and 2. The velocities of the endpoints are established at $V_m$, and the velocities of the intermediate joints 2 through n−1 (joints B through I of FIG. 9) are preferably calculated using Equation 3 or 4 (whichever is preferred). In selecting an independent solution, also known as an open-loop control system, the signal controlling the output is independent of the output; in selecting a dependent solution, also known as a closed-loop control system, the signal controlling the output is depends on the output. Once the velocity for each segment associated with a misaligned joint has been calculated, these new velocities will be implemented by sending correcting drive signals to the associated drive units in order to affect a speed change at the drive unit. In the case shown in FIG. 9, the velocities of the tracks proximate to nodes d, f, n and p at respective joints B, C, G and H are reduced to align the joints, while the velocities of the tracks proximate to nodes h, j, and l, at respective joints D, B and F are increased to align the joints.

It will be observed that, for example, by reducing the velocity at track H, misalignment will be introduced into joint I. Once the processor has surveyed the system again to determine which joints are out of alignment and by how much, correction will be needed at joint I. However, the correction will be very small and the velocity of the segments adjacent to section I will be differentially small from the established bulk velocity for the conveyor system. Recall that tracks B and T are maintained at the maximum allowed bulk velocity $V_m$ for the system. While minor corrections are being made at joint I, larger corrections are being made at joints C through H. Thus the system will converge joints B through I into alignment at approximately the same time. As discussed previously, the control system continues to survey the joints, adjusting velocities and directions of travel until the system is in alignment. In one example, the cycle time for establishing corrections and correction velocities is 200 milliseconds. Therefore, the control system is constantly, adaptively, adjusting the velocities of the track at the associated joint in order to bring the joints into alignment in a smooth continuous manner.

In another example wherein the conveyor system 10 in FIG. 9 is traveling in the direction B, the misalignment of sections 103 and 108 may also be caused by downhill sloping of the ground in the direction of B. Since the system is positive/negative sensitive (direction of travel, as well as direction of misalignment, as discussed previously), the equations will determine that the velocities of the tracks at joints B, C, G and H will be accelerated to align the joints, while the velocities of the tracks at joints D, E and F will be increased. This is just the opposite of when the conveyor system is traveling in direction A.

The net result in either case (travel in direction A or B) is typically that the outermost misaligned joints will tend to be aligned first, working inward towards the innermost misaligned joint. For example, referring to FIG. 9, the joints will be aligned in the order of the numbers with prime markers.

Turning now to FIG. 10, a conveyor system 10 of the present invention is shown. For various reasons, it may be desirable to maintain the conveyor system in the curved form shown in the figure. This may be accomplished by calibrating the joints to the θ values shown in the figure starting with $\theta_1$ through $\theta_9$. A minimum acceptable articulation beyond which no alignment correction is required may still be defined for each joint. If the velocity of points "a" and "t" remain constant with respect to one another, the segments 201 through 210 will be aligned in the order shown by the primed numbers.

Turning now to FIG. 11, an exemplary logic diagram for one implementation of the method of aligning the conveyor system is shown and will be described in panels 12A and 12B. The logic diagram consists of various steps: step S1 through step S19. Each step will now be described in detail.

Figures 12, 12A, 12B:
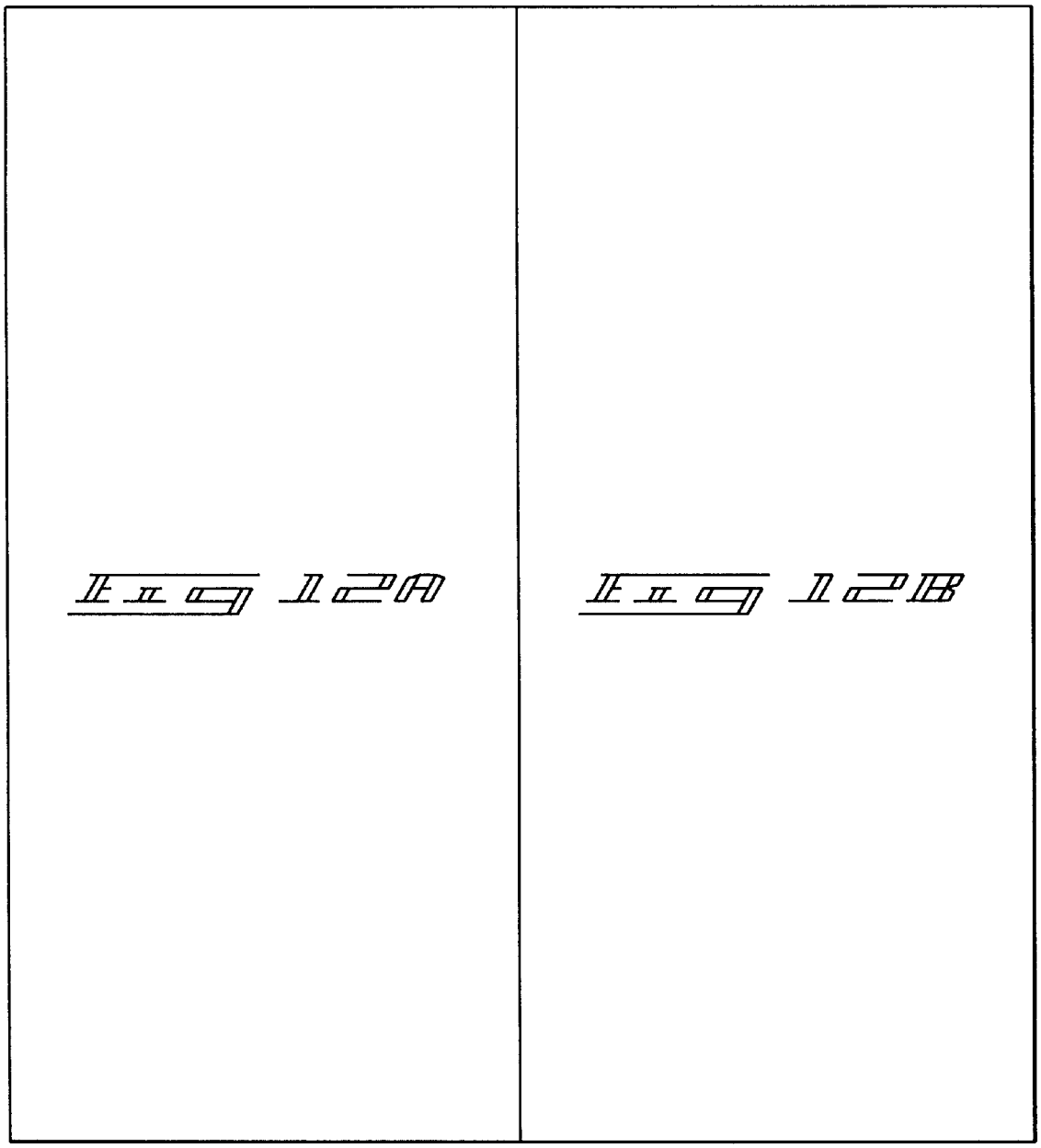
FIG. 12A is the first of two panels showing a block diagram of a control logic for a control system used to implement the method of the present invention.
FIG. 12B is the second of two panels showing a block diagram of a control logic for a control system used to implement the method of the present invention.
Figure 12A:
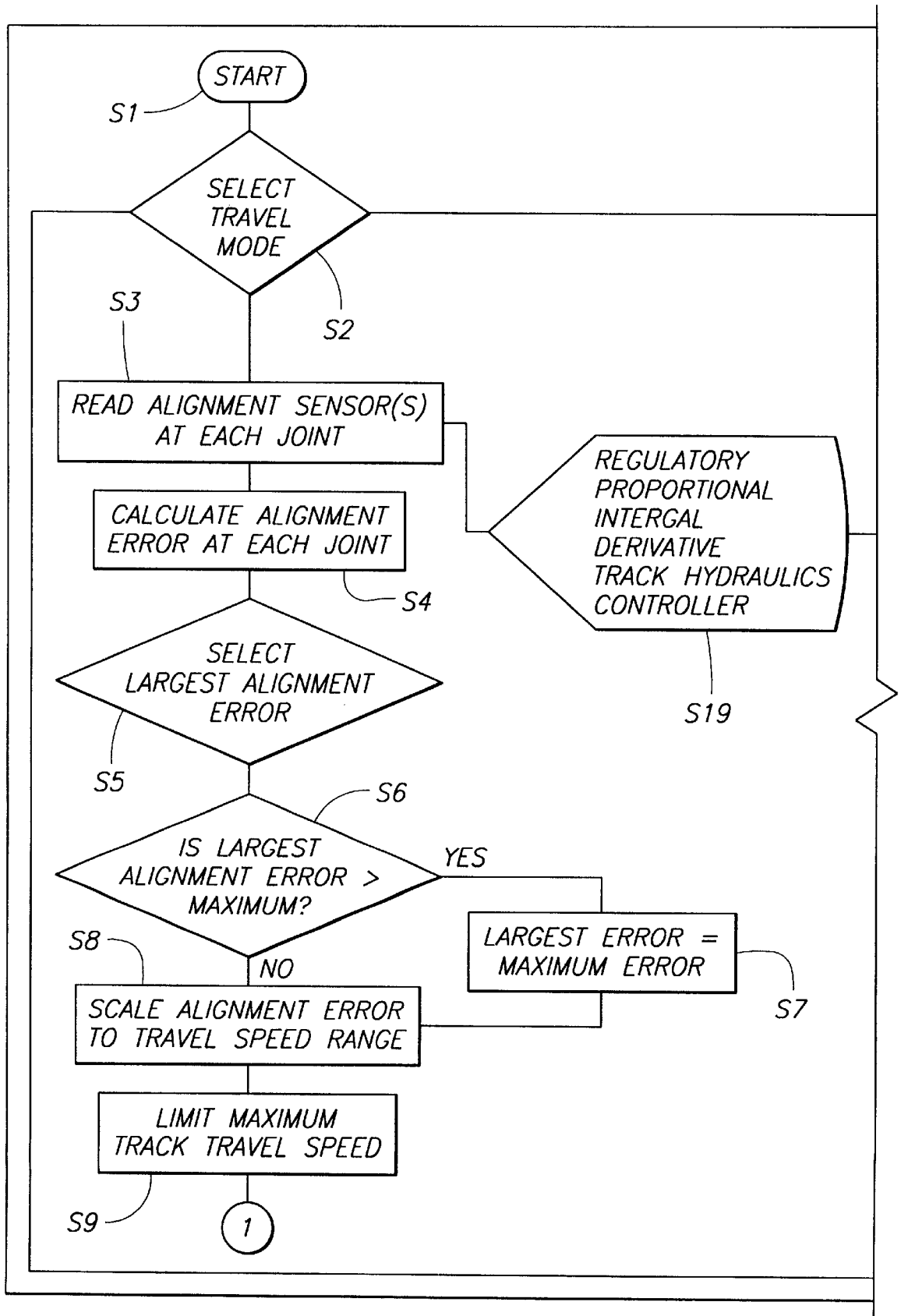

Starting with FIG. 12A, in step S1, the system is initialized. Initialization may include such things as retrieving calibration figures from memory into the processor and loading the program for performing the calculations.

In step S2, a travel mode is selected. Typically, the selection will be done by an operator. The various travel modes were described above.

In step S3, the control system reads the alignment sensor or sensors at each joint. The values may be placed in machine memory for subsequent calculations. The system thereafter proceeds to step S4.

In step S4, the control system calculates the alignment error at each joint. Such calculations are known in the art and are based on the type of sensor employed and its output, the physical parameters of the conveyor system, and the required inputs for the signal processor. The system thereafter proceeds to step S5.

In step S5, the control system selects the largest alignment error of the alignment errors calculated in step S4. The system thereafter proceeds to step S6.

In step S6, the system looks at the largest alignment error to see if it has exceeded the maximum allowable alignment error for the conveyor system. If the largest measured alignment error does in fact exceed the maximum allowable error, the system proceeds to step S7.

In step S7, the maximum measured alignment error is set equal to the maximum allowable error. The system then proceeds on to step S8. If the largest alignment error measured in the system and compared to the maximum allowable in step S6 is less than or equal to the maximum allowable alignment error, the system then proceeds directly to step S8.

In step S8, the system scales the alignment error to the travel speed range. This is done according to Equations 1 and 2. The control system then proceeds to step S9.

In step S9, the maximum track travel speed for tracks not out of alignment is limited to $V_{max}$. The system then proceeds to step S10.

In step S10, the direction and speed of track 1 at segment 1 are established. This direction and speed are based upon the travel mode selected in S2, and described above for FIGS. 1 and 14A through 14E, and reverse directions to those shown therein. The system then proceeds to step S11.

In step S11, the direction and speed of track "n" at conveyor segment n are set. Again the direction is based upon the travel mode selected in step S2 and the speed is dependent upon the speed of track 1 and the travel mode, as described above for FIGS. 1 and 14A through 14E, and reverse directions to those shown therein. For example, if the conveyor system is moving in a simple forward or a reverse direction, then the velocity of track n is equal to the velocity of track 1. Such would also be the case if the conveyor system were rotating about the center segment (segment n/2). However, if the conveyor system is rotating about one of the end tracks, track 1 or track n, then the velocity at track n or 1 (respectively) will need to be calculated based upon the length of the conveyor system and the desired speed of rotation, as described above. Once the direction of velocity of track n has been established, the system proceeds to step S12.

In step S12, the bulk velocities $V_i$ for the individual tracks 2 through (n−1) are established based on the travel mode. For example, if the travel mode were selected to be a simple forward or reverse mode, then the intermediate tracks 2 through (n−1) will have the same bulk velocity as track 1 and track n. However, if the conveyor system is in a rotate mode, then the intermediate tracks will need to be moved at proportional rates in order to achieve the desired overall movement. Such is established by basic linear proportioning based on the velocity at the end points and the velocities required at mid-points to maintain the velocity at the end points. The directions and speeds calculated in this step S12 are merely based on the selected travel mode and the set-point velocity $V_b$. These directions and speeds will be used for tracks 2 through (n−1) where no correction is needed for misalignment. After these intermediate bulk speeds for the different joints have been established, the system proceeds to step S13.

In step S13, the system looks to see whether the travel command (which may have been initiated by an operator or may be automatic) has been completed. For example, for the conveyor system shown in FIG. 1, the travel command will be completed when the conveyor system 10 has advanced a distance I after having filled the area 6. If the travel command has been completed, then the system moves to step S2 to select a new travel mode. If the travel command has not been completed then the system proceeds to step S14.

In step S14, the system looks to see whether any of the sections are out of alignment beyond the maximum allowable alignment. If they are, then the system proceeds to step S2 where the conveyor system is stopped and awaits a new travel mode. Also at this time, the system may alert an operator with an alarm or the like to notify the operator that one of the segments is out of alignment beyond the maximum allowable misalignment. The system then proceeds to step S15.

In step S15, the system checks to determine whether all the hydraulic systems are operating properly. The hydraulic systems are typically the systems used to control the drive units or the tracks. If in fact there is a problem with any one of the hydraulic units then the system proceeds to step S16 where it stops travel and then on to step S17 where it performs a diagnostic and alarms the operator. However, assuming there are no operating problems with the hydraulic system, the control system proceeds on to step S18.

In step S18, the speed and directions for the intermediate tracks 2 through (n−1) are established for misaligned joints by taking the bulk velocities calculated in step S12 and modifying them according to the error detected at each misaligned joint, using Equations 3 through 9, as appropriate. The speed of the intermediate tracks is based upon the error detected at each segment joint in step S3. For those segments where no error was detected or was within the minimum acceptable range, then the speed of the track is based upon the direction and speed calculated in step S12, but as limited by $V_m$. For example, where the conveyor is moving in a forward or reverse direction, then tracks at which no acceptable error was detected will continue to move at the maximum bulk velocity $V_{max}$. However, for tracks where error was detected, a new velocity is calculated using Equations 3 through 9, as appropriate. Once the intermediate travel speeds have been determined, the system moves on to step S19.

In step S19, the calculations are performed to actually send a speed control signal to the individual tracks at each conveyor segment based upon the velocities and directions calculated in steps S10, S11, S12, and S18. In the example shown in FIG. 12A, speeds of the various tracks are calculated using a regulatory proportional integral derivative (PID) control logic. Once the various track speed signals and track direction signals have been calculated and sent to the various drive units controllers, the conveyor control system then proceeds to step S3 and reads the alignment sensors at each joint to begin the whole process anew. In this manner, the system is continually checking the alignment at each joint and adjusting the velocity of the tracks at the various segments to maintain the travel mode selected in step S2.

Thus, a conveyor has been disclosed which includes a speed adaptive control system for quickly and accurately aligning adjacent sections of the conveyor without the need for a complicated mechanism, such as a mechanism having a series of pulleys and cables.

Mobil material transport systems include not only the conveyor systems described herein, but any other systems having two or more articulated segments and configured to transport materials, such as a multi-segmented overland agricultural sprinkler system. In addition to multi-segmented mobil material transport systems, the method of alignment disclosed and claimed herein may also be applied to any multi-segmented system which it is desirable to align.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A mobile material transport alignment method for aligning a mobile material transport system which may become misaligned, said transport system having a plurality of segments connected to one another at articulable joints such that each joint has two adjacent transport segments, misalignment of said transport system being defined by a segment being non-collinear with an immediately adjacent segment beyond a predetermined acceptable amount of non-collinearity, said method comprising the steps of:

surveying said joints to identify misaligned joints;

measuring the amount of non-collinearity at each said misaligned joint;

identifying a maximum misaligned joint, said maximum misaligned joint being the misaligned joint having the greatest amount of non-collinearity of all said misaligned joints;

establishing first rates and directions of travel for conveyer segments immediately adjacent said maximum misaligned joint to establish a first joint rate and direction of travel being calculated to bring said maximum misaligned joint into alignment;

calculating secondary rates and directions of travel for conveyer segments immediately adjacent to each said secondary misaligned joint to establish secondary joint rates and directions of travel, said secondary joint rates of travel being less than said first joint rate of travel;

moving said segments immediately adjacent said maximum misaligned joint at said first joint rate and direction of travel, and moving said segments immediately adjacent said secondary misaligned joints at said secondary joint rates and directions of travel, to align said material transport system;

wherein said conveyor system is traveling on a prescribed path at a bulk velocity, the method further comprising the step of limiting said bulk velocity to a restricted velocity while allowing said first joint rate of travel to exceed said restricted velocity.

2. The method of claim 1 wherein the method is repeated until none of said joints are misaligned.

3. The method of claim 1 wherein said joints are defined by a maximum articulation limit, and wherein said first joint rate of travel is proportional to the ratio of said greatest amount of non-collinearity to said maximum articulation limit.

4. The method of claim 1 wherein said bulk velocity is a linear velocity.

5. The method of claim 1 wherein said bulk velocity is an angular velocity.

6. The method of claim 1 wherein said segments of said material transport system are to be aligned along a generally straight line, and wherein said material transport system is traveling in a direction essentially orthogonal to said generally straight line.

7. The method of claim 1 further comprising the preliminary step of establishing an alignment line along which said conveyor system is to be aligned.

8. The method of claim 7 wherein said conveyor system is defined by endpoints and wherein said alignment line is established by laser survey connecting said endpoints.

9. The method of claim 1 wherein said first joint rate of travel and said secondary joint rates of travel are scaled according to associated misalignment at each said joint.

10. The method of claim 9 wherein said scaling is proportional scaling.

11. The method of claim 10 wherein said scaling further includes an integral term.

12. The method of claim 11 wherein said scaling further includes a derivative term.

13. The method of claim 1 wherein:

said joints are defined by a maximum articulation limit;

said restricted velocity is calculated by multiplying said bulk velocity by the quantity of one minus the ratio of said greatest amount of non-collinearity to said maximum articulation limit.

14. The method of claim 13 wherein said restricted velocity is limited to being not less than a predetermined percent of said bulk velocity.

15. The method of claim 13 wherein said first rates of travel are calculated by adding said restricted velocity to a first correcting velocity, said first correcting velocity comprising a term equal to a first constant times said greatest amount of non-collinearity.

16. The method of claim 15, wherein said secondary rates of travel are calculated by adding said restricted velocity to an associated second correcting velocity associated with each said secondary misaligned joint, said second correcting velocities having a term equal to said first constant times said associated secondary amounts of non-collinearity.

17. The method of claim 16 wherein said first correcting velocity further comprises a term equal to a second constant times the integral of said greatest amount of non-collinearity over the time said segments immediately adjacent said maximum misaligned joint are moved to align said material transport system.

18. The method of claim 17 wherein said second correcting velocities further comprise a term equal to said second constant times the integral of said associated secondary amounts of non-collinearity over the time said associated segments immediately adjacent said secondary misaligned joints are moved to align said material transport system.

19. A mobile material transport alignment method for aligning a mobile material transport system which may become misaligned, said transport system having a plurality of segments connected to one another at articulable joints such that each joint has two adjacent transport segments, misalignment of said transport system being defined by a segment being non-collinear with an immediately adjacent segment beyond a predetermined acceptable amount of non-collinearity, said method comprising the steps of:
surveying said joints to identify misaligned joints;
measuring the amount of non-collinearity at each said misaligned joint;
identifying a maximum misaligned joint, said maximum misaligned joint being the misaligned joint having the greatest amount of non-collinearity of all said misaligned joints;
establishing first rates and directions of travel for conveyer segments immediately adjacent said maximum misaligned joint to establish a first joint rate and direction of travel being calculated to bring said maximum misaligned joint into alignment;
calculating secondary rates and directions of travel for conveyer segments immediately adjacent to each said secondary misaligned joint to establish secondary joint rates and directions of travel, said secondary joint rates of travel being less than said first joint rate of travel;
moving said segments immediately adjacent said maximum misaligned joint at said first joint rate and direction of travel, and moving said segments immediately adjacent said secondary misaligned joints at said secondary joint rates and directions of travel, to align said material transport system;
said segments of said material transport system are to be aligned along a generally straight line;
said material transport system is defined by a first endpoint and a second endpoint;
said material transport system is traveling in generally circular motion about said first endpoint giving a determined velocity to said second endpoint equal to said bulk velocity; and
intermediate bulk velocities are calculated for each said joint by multiplying said bulk velocity by the ratio of said distance from said first endpoint to said joint by the distance from said first endpoint to said second endpoint.

20. The method of claim 19 wherein said first rates of travel and said secondary rates of travel are calculated by:

$$V_i = V_{i-1}\left(\frac{r_1}{r_i}\right) \text{ where } 1 \le i \le n/2 \qquad (\text{Eqn. 7.})$$

and $$V_i = V_{i-1}\left(-\frac{r_n}{r_i}\right) \text{ where } n/2 \le i \le n. \qquad (\text{Eqn. 8.})$$

21. A mobile material transport alignment method for aligning a mobile material transport system which may become misaligned, said transport system having a plurality of segments connected to one another at articulable joints such that each joint has two adjacent transport segments misalignment of said transport system being defined by a segment being non-collinear with an immediately adjacent segment beyond a predetermined acceptable amount of non-collinearity, said method comprising the steps of:
surveying said joints to identify misaligned joints;
measuring the amount of non-collinearity at each said misaligned joint;
identifying a maximum misaligned joint, said maximum misaligned joint being the misaligned joint having the greatest amount of non-collinearity of all said misaligned joints;
establishing first rates and directions of travel for conveyer segments immediately adjacent said maximum misaligned joint to establish a first joint rate and direction of travel being calculated to bring said maximum misaligned joint into alignment;
calculating secondary rates and directions of travel for conveyer segments immediately adjacent to each said secondary misaligned joint to establish secondary joint rates and directions of travel, said secondary joint rates of travel being less than said first joint rate of travel;
moving said segments immediately adjacent said maximum misaligned joint at said first joint rate and direction of travel, and moving said segments immediately adjacent said secondary misaligned joints at said secondary joint rates and directions of travel, to align said material transport system;
wherein said conveyor system is traveling along a prescribed path in a first direction at a bulk velocity established at a reference point along said conveyor system, said reference point being a point on a reference line of alignment to which said joints are to be aligned, said reference line defining a region ahead of the direction of travel and a region behind the direction of travel,
said method further comprising the steps of:
causing misaligned joints in said region behind the direction of travel to travel in the direction of travel at velocity greater than said bulk velocity; and
causing misaligned joints in said region ahead of the direction of travel to travel in the direction of travel at velocity less than said bulk velocity.

22. In the method of claim 21 wherein said maximum misaligned joint lies in the region behind the direction of travel, the method further comprising the step of limiting said bulk velocity to a restricted velocity while allowing said first rate of travel to exceed said restricted velocity.

23. The method of claim 22 further comprising the steps of defining a maximum tolerable amount of non-collinearity for any given joint and defining a maximum bulk velocity for said conveyor system, and wherein said restricted velocity is established by multiplying said maximum bulk velocity by the ratio of said greatest amount of non-collinearity to said maximum tolerable amount of non-collinearity.

24. The method of claim 22 further comprising the steps of defining a maximum tolerable amount of non-collinearity for any given joint and defining a maximum bulk velocity for said conveyor system, and wherein said restricted velocity is established by multiplying said maximum bulk velocity by the quantity of one minus the ratio of said greatest amount of non-collinearity to said maximum tolerable amount of non-collinearity.

25. The method of claim 22 wherein the method is repeated until none of said joints are misaligned.

26. Method for aligning a conveyor system which may become misaligned from a direction of alignment, said conveyor system comprising a plurality of segments connected to one another at articulable joints, misalignment of said conveyor system being defined by a segment being non-collinear with an immediately adjacent segment beyond a predetermined acceptable amount of non-collinearity, said method comprising the steps of:

moving said conveyor system in a first direction at a bulk velocity, said first direction being essentially perpendicular to said direction of alignment;

surveying said joints to identify misaligned joints;

measuring the amount of non-collinearity at each said misaligned joint;

identifying a maximum misaligned joint, said maximum misaligned joint being the misaligned joint having the greatest amount of non-collinearity of all said misaligned joints;

establishing variable velocity rates and directions of travel for each said misaligned joint, wherein:

said variable velocity rates and direction of travel of said maximum misaligned joint is established to align adjacent segments of said maximum misaligned joint at a first rate faster than secondary misaligned joints, said secondary misaligned joints being misaligned joints other than said maximum misaligned joint; and said variable velocity rates and directions of travel of said secondary misaligned joints are established to align adjacent segments of said secondary misaligned joints, said variable velocity rates and directions of travel of said secondary misaligned joints being scaled to said maximum misaligned amount according to their respective amounts of non-collinearity.

27. In the method of claim 26 wherein said conveyor travels to a first position and a second position, said first position being reached by traveling in said first direction, the method further comprising the steps of:

stopping travel of said conveyor system in said first direction upon reaching said first position;

aligning said conveyor according to the claimed method; and resuming travel of said conveyor system in said first direction towards said second position while aligning said conveyor according to the claimed method.

28. In the method of claim 26 wherein said conveyor travels between a first position and a second position, said first position being reached by traveling in said first direction, the method further comprising the steps of:

stopping travel of said conveyor system in said first direction upon reaching said first position;

aligning said conveyor according to the claimed method; and moving said conveyor in a second direction towards said second position while aligning said conveyor according to the claimed method.

29. The method of claim 26 wherein:

a maximum possible bulk velocity $V_b$ is established for said conveyor system;

a maximum allowable amount of non-collinearity $ERR_{MAX}$ is established for any said joint; and a maximum allowed bulk velocity $V_{max}$ is established for said conveyor system such that $V_{max}=V_b \times (1-|err_{max}/Err_{MAX}|)$, wherein $Err_{max}$ is equal to said greatest amount of non-collinearity.

30. The method of claim 29 wherein the rate of travel at each said misaligned joint $V_{ji}$ is established such that $$V_{ji} = V_{max} + k_p Err_{ji} + k_{i'} \int_0^t Err_{ji} + k_d \frac{dv}{dt}(Err_{ji})$$

wherein $Err_{ji}$ is the amount of non-collinearity at each said misaligned joint, and $k_p$, $k_i$, and $k_d$ are constants chosen to critically align said joints with respect to time.

31. The method of claim 29 wherein the rate of travel at each said misaligned joint $V_{ji}$ is established such that $$V_{ji} = V_{max} + k_p \left[ Err_{ji} + \frac{1}{T_{i'}} \int_0^t Err_{ji} + T_d \frac{dv}{dt}(Err_{ji}) \right]$$

wherein $Err_{ji}$ is the amount of non-collinearity at each said misaligned joint, and $k_p$, $T_i$, and $T_d$ are constants chosen to critically align said joints with respect to time.

32. A mobile material transport system configured to move over a surface on which said conveyor system is supported at a bulk velocity, said material transport system comprising:

a plurality of segments connected at articulable joints, each said joint connecting two of the segments and being articulable over a range of magnitudes, each said segment further comprising a drive unit configured to move said segment relative to said surface, each said drive unit being actuated by an associated drive actuator, and wherein articulation at said joints is to be controlled about an acceptable articulation range;

a sensor connected to each of at least two of said articulable joints, said sensor configured to detect the amount of articulation at said joint between segments connected at said joint and generate a first signal in response thereto, said first signal comprising information indicating the magnitude of articulation at said associated joint; and a signal processor, said signal processor configured to process said first signals to identify and determine magnitudes of articulation exceeding said acceptable articulation range and to generate correcting driving signals in response thereto, said correcting driving signals being used to actuate said drive actuators to cause said segments at joints exceeding said acceptable articulation range to be repositioned so as to bring such joints within said acceptable articulation range, said signal processor further configured to control the velocity and direction of the joints allowing varying velocities and directions during travel to be used during movement of the mobile material transport system to achieve aligned operational movement dependent on the magnitude of articulation of the associated joint.

33. The mobile conveyor of claim 32, wherein said sensors comprise string pot sensors.

34. The mobile conveyor of claim 32 further comprising a second sensor at joints having a first sensor, said sensor configured to detect the amount of articulation at said joint between segments connected at said joint and generate a second signal in response thereto, said second signal comprising information indicating the magnitude of articulation at said associated joint, and wherein said processor is configured combine said first signal and said second signal for an associated joint to produce a combined signal which is then processed to identify and determine magnitudes of articulation exceeding said acceptable articulation range and to generate correcting driving signals in response thereto.

35. A mobile conveyor system aligning apparatus for a conveyor system configured to move at a bulk velocity over a surface on which said conveyor system is supported, said conveyor system having a plurality of segments connected at articulable joints, each said joint connecting two of the segments and being articulable over a range of magnitudes, each said segment further comprising a drive unit configured to move said segment relative to a surface on which said conveyor segment may be supported, each said drive unit being actuated by an associated drive actuator, and wherein articulation at said joints is to be controlled about an acceptable articulation range, said aligning apparatus comprising:

a sensor connected to each of at least two of said articulable joints, said sensor configured to detect the amount of articulation at said joint between segments connected at said joint and generate a first signal in response thereto, said signal comprising information indicating the magnitude of articulation at said associated joint;

a signal processor, said signal processor configured to process said first signals to identify and determine magnitudes of articulation exceeding said acceptable articulation range and to generate correcting driving signals in response thereto, said correcting driving signals being used to actuate said drive actuators to cause said segments at joints exceeding said acceptable articulation range to be repositioned so as to bring such joints within said acceptable articulation range, said signal processor further configured to reposition such joints by controlling the velocity of such joints using varying velocity rates, said varying velocity rates being dependent on the magnitude of articulation of the associated joint.

36. The apparatus of claim 35 wherein:

segments at joints may articulate in both a clockwise and a counterclockwise direction with respect to one another;

said signal further comprises information indicating the direction of articulation at the associated joint;

said signal processor is further configured to process said signals to determine relative directions of articulation of the associated joints, and wherein said correcting driving signals constitute a directional component to ensure that said drive units are actuated to drive said joint in a direction towards said acceptable articulation range.

37. The apparatus of claim 35, further comprising a second sensor at joints having a first sensor, said sensor configured to detect the amount of articulation at said joint between segments connected at said joint and generate a second signal in response thereto, said second signal comprising information indicating the magnitude of articulation at said associated joint, and wherein said processor is configured to combine said first and said second signal for an associated joint to produce a combined signal which is then processed to identify and determine magnitudes of articulation exceeding said acceptable articulation range and to generate correcting driving signals in response thereto.

38. The apparatus of claim 35 wherein said joints articulate in planes of articulation about points of articulation, and wherein said sensor comprises a linear displacement detector configured to measure lineal displacement between reference points on adjacent segments in response to articulation thereof, said reference points being located distal from said point of articulation.

39. The apparatus of claim 38 wherein said sensors comprise string pot sensors.

40. The apparatus of claim 35 wherein said processor is further configured to allow said bulk velocity of said conveyor system to be limited to ensure that all said joints exceeding said acceptable articulation range may be repositioned within said acceptable articulation range.

41. The apparatus of claim 40 wherein:

a maximum articulation value is established for said joints;

said processor is configured to determine a ratio between said magnitudes of articulation exceeding said acceptable articulation range and said maximum articulation value to generate said correcting driving signals proportional to said ratios.

42. The apparatus of claim 41 wherein:

a maximum possible bulk velocity $V_b$ is established for said conveyor system;

the bulk velocity of said drive actuators may be limited to a maximum allowed bulk velocity $V_{max}$ by bulk speed control signals generated by said processor; and said processor is configured to identify the largest magnitude of articulation $Err_{max}$ exceeding said acceptable articulation range $ERR_{MAX}$ and to generate bulk speed control signals to limit $V_{max}$ such that $$V_{max} = V_b \times (1 - |Err_{max}/Err_{MAX}|).$$

43. The apparatus of claim 42 wherein:

said drive actuators associated with a joint can be controlled to a joint velocity $V_{ji}$ by said correcting driving signals;

said correcting driving signals are generated by said processor such that $$V_{ji} = V_{max} + k_p Err_{ji} + k_i \int_0^t Err_{ji} + k_d \frac{dv}{dt}(Err_{ji})$$

wherein $Err_{ji}$ is the amount of non-collinearity at each said misaligned joint, and $k_p$, $k_i$, and $k_d$ are constants chosen to critically align said joints with respect to time.

* * * * *